(12) United States Patent
Dias et al.

(10) Patent No.: US 11,639,745 B2
(45) Date of Patent: May 2, 2023

(54) SELF-LOCKING CABLE SECURING DEVICE, ASSEMBLY AND METHOD

(71) Applicant: Quick Fitting Holding Company, LLC, Warwick, RI (US)

(72) Inventors: Libardo Ochoa Dias, West Warwick, RI (US); Herbert J. Bouchard, West Greenwich, RI (US); David B. Crompton, Stonington, CT (US)

(73) Assignee: Quick Fitting Holding Company, LLC, Warwick, RI (US)

( * ) Notice: Subject to any disclaimer, the term of this patent is extended or adjusted under 35 U.S.C. 154(b) by 0 days.

(21) Appl. No.: 17/370,416

(22) Filed: Jul. 8, 2021

(65) Prior Publication Data

US 2023/0011352 A1    Jan. 12, 2023

(51) Int. Cl.
*F16G 11/10* (2006.01)
*F16G 11/04* (2006.01)

(52) U.S. Cl.
CPC .............. *F16G 11/10* (2013.01); *F16G 11/04* (2013.01)

(58) Field of Classification Search
CPC ................................ F16G 11/10; F16G 11/04
See application file for complete search history.

(56) References Cited

U.S. PATENT DOCUMENTS

| | | |
|---|---|---|
| 1,265,141 A | 5/1918 | Trippe |
| 3,175,265 A * | 3/1965 | Gunderson ............. F16G 11/10 280/480 |
| 3,776,586 A | 12/1973 | Ahlgren et al. |
| 3,852,850 A | 12/1974 | Filhaber |
| 4,635,989 A | 1/1987 | Tremblay et al. |
| 4,637,643 A * | 1/1987 | Johnson ................ F16G 11/025 294/82.11 |
| 5,015,023 A | 5/1991 | Hall |
| 5,233,730 A | 8/1993 | Milne et al. |
| 5,369,849 A | 12/1994 | De France |
| 5,383,259 A * | 1/1995 | McIntire ................. B62J 7/08 24/265 H |
| 5,622,642 A | 4/1997 | Edwards et al. |
| 6,058,574 A | 5/2000 | Facey et al. |
| 6,883,782 B2 | 4/2005 | Ames et al. |
| 7,007,350 B1 | 3/2006 | Franke |
| 7,043,801 B2 * | 5/2006 | Toimil ................... F16G 11/106 24/136 R |
| 7,478,794 B1 | 1/2009 | Gohlke et al. |

(Continued)

FOREIGN PATENT DOCUMENTS

| | | |
|---|---|---|
| CN | 205387792 | 7/2016 |
| DE | 2250881 | 4/1974 |

(Continued)

OTHER PUBLICATIONS

International Search Authority, International Search Report and Written Opinion for PCT/US22/36315, dated Oct. 11, 2022.

*Primary Examiner* — David M Upchurch
(74) *Attorney, Agent, or Firm* — Williams Mullen; Thomas F. Bergert

(57) ABSTRACT

A self-locking securing device facilitates secure connection to cable or elongated object ends, and employs a retaining jaw, a barrel, a spacer and a sleeve. In various embodiments, the retaining jaw and spacer are formed as part or all of a replaceable cartridge and can include a fastening ring therebetween.

20 Claims, 24 Drawing Sheets

(56) References Cited

U.S. PATENT DOCUMENTS

| | | | |
|---|---|---|---|
| 8,292,267 B2 | 10/2012 | Jordan et al. | |
| 8,385,712 B2 | 2/2013 | Ahmed | |
| 8,585,019 B2 | 11/2013 | Melsheimer et al. | |
| 8,839,591 B2 | 9/2014 | Guthrie et al. | |
| 9,027,908 B1 | 5/2015 | Calhoun et al. | |
| 10,461,514 B2 * | 10/2019 | Crompton | F16G 11/025 |
| 11,018,481 B1 * | 5/2021 | Crompton | H02G 1/081 |
| 11,391,344 B1 * | 7/2022 | Sargent | F16G 11/106 |
| 11,428,295 B1 | 8/2022 | Dias et al. | |
| 2002/0076274 A1 | 6/2002 | Carlsen et al. | |
| 2004/0007874 A1 | 1/2004 | Minami | |
| 2004/0041136 A1 | 3/2004 | Ames et al. | |
| 2009/0224220 A1 | 9/2009 | Jordan et al. | |
| 2009/0238534 A1 | 9/2009 | Ahmed | |
| 2010/0051886 A1 | 3/2010 | Cooke et al. | |
| 2011/0084180 A1 | 4/2011 | Toimil et al. | |
| 2013/0221298 A1 | 8/2013 | Bennett et al. | |
| 2018/0003202 A1 * | 1/2018 | White | F16G 11/025 |
| 2020/0067287 A1 * | 2/2020 | Crompton | F16G 11/106 |
| 2020/0406074 A1 * | 12/2020 | Fjelldal | F16F 1/125 |

FOREIGN PATENT DOCUMENTS

| | | |
|---|---|---|
| EP | 2108874 | 10/2009 |
| JP | 2004286221 | 10/2004 |
| WO | 2004036711 | 4/2004 |

\* cited by examiner

Fig. 24
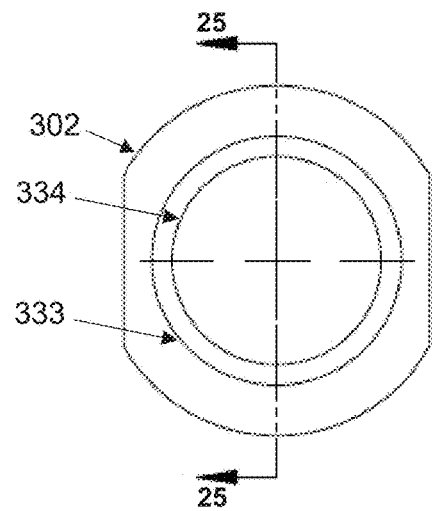
Fig. 25
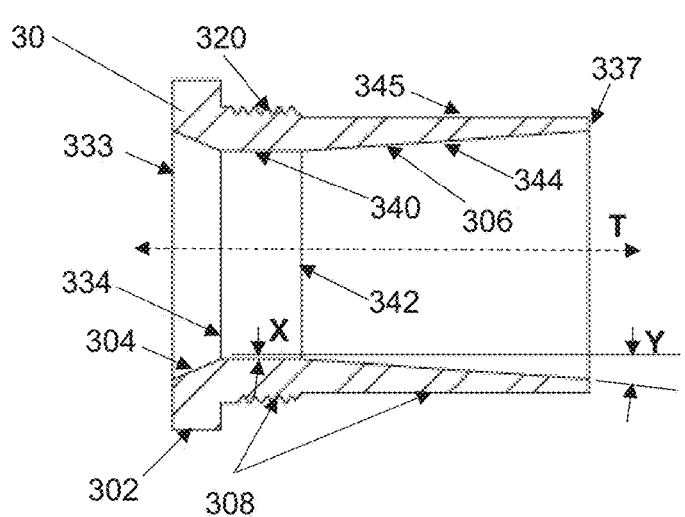
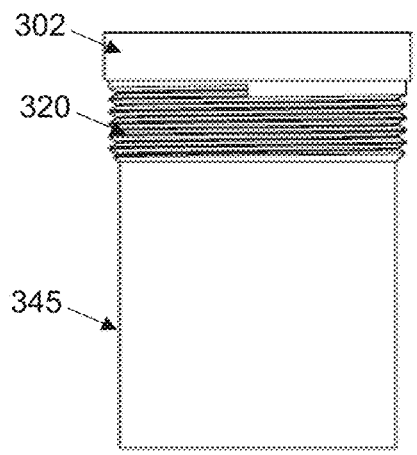
Fig. 26

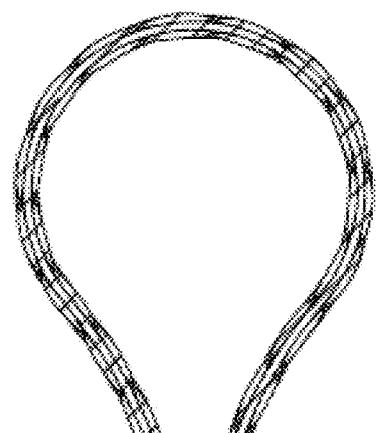
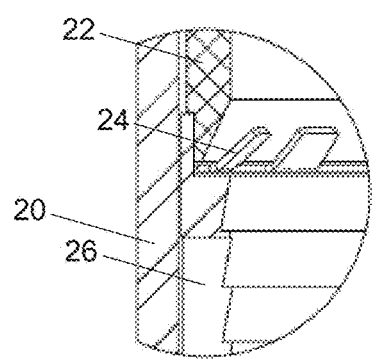
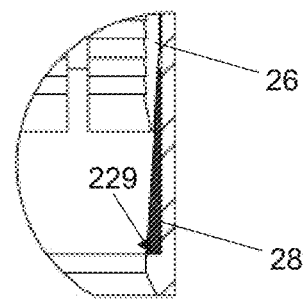
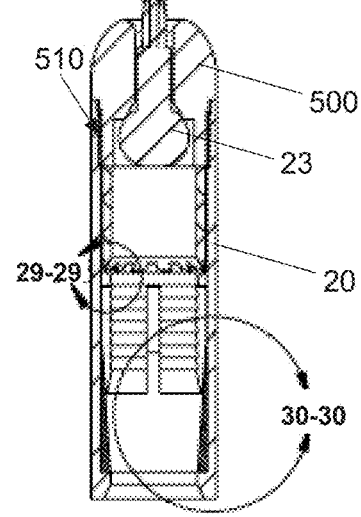
Fig. 28
Fig. 29
Fig. 30

Fig. 36
Fig. 37
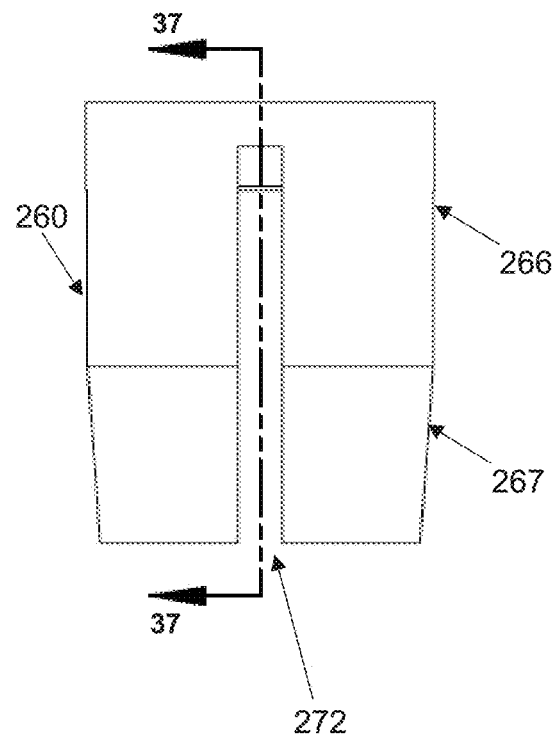
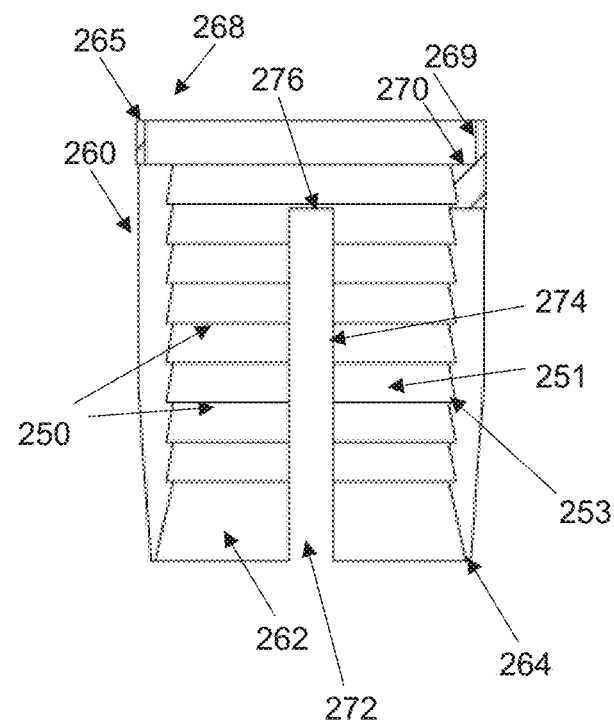
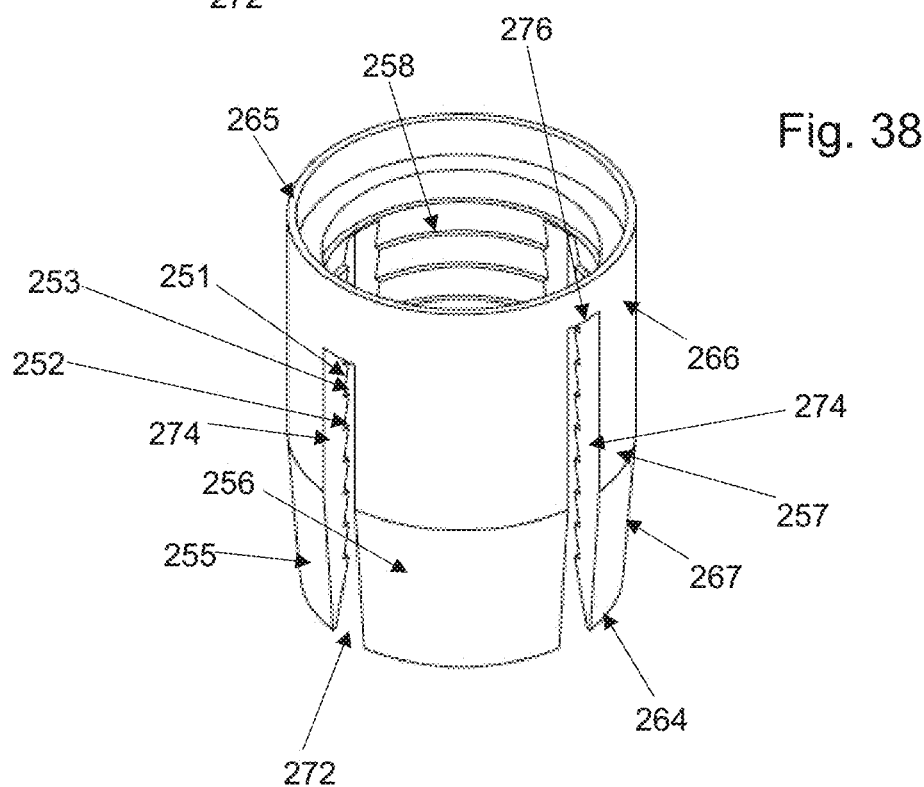
Fig. 38

Fig. 46
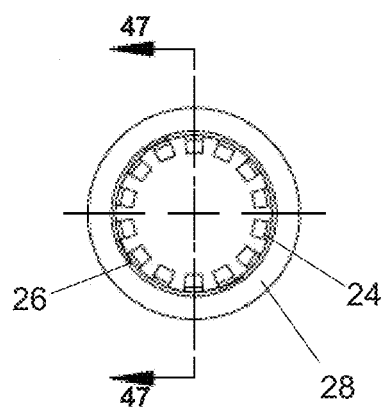
Fig. 47
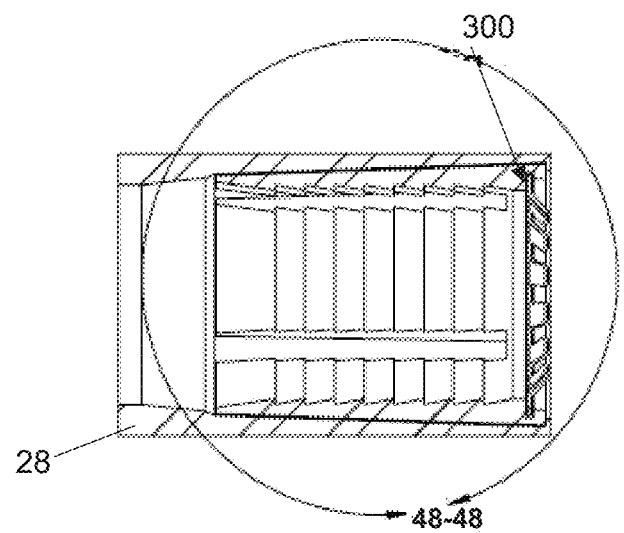
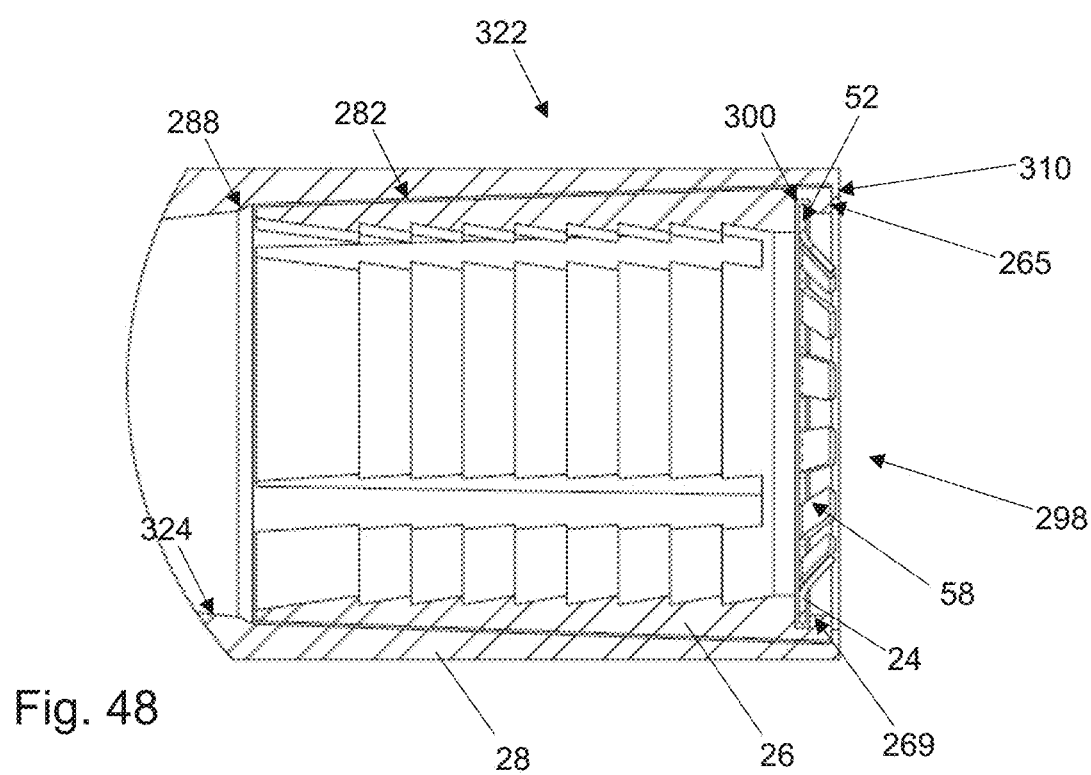
Fig. 48

Fig. 49
Fig. 50
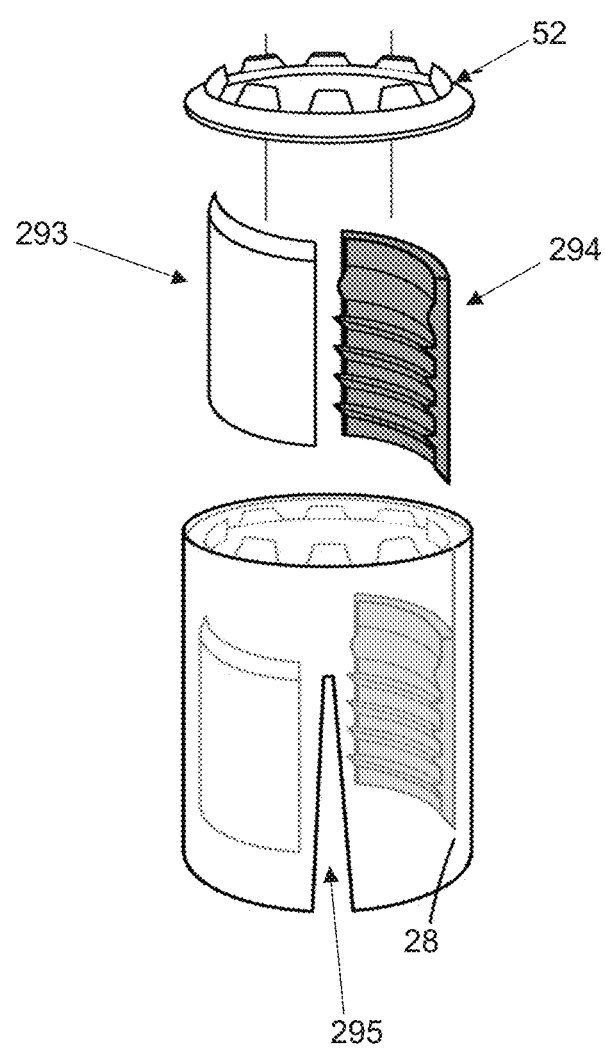
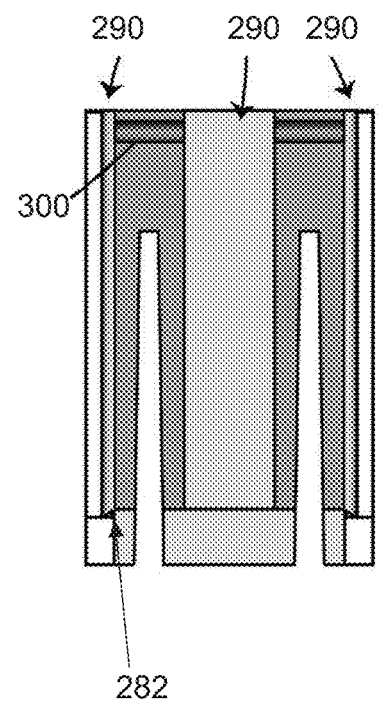

SELF-LOCKING CABLE SECURING DEVICE, ASSEMBLY AND METHOD

TECHNICAL FIELD

The present disclosure relates to a securing device that facilitates connection with a cable or elongated object and pulling the cable or elongated object.

BACKGROUND

Proper wiring and cable management in building structures is essential to the safe and effective operation of the building's electrical and cabling operation. Further, proper connection to a cable, wire, pipe, tube or similar elongated element is important to maintaining a sufficient grip on the element.

When wiring or cabling needs to be protected from potential damage, it can be pulled through various types of conduits. Conduit can be made of metal, rigid plastic (e.g., PVC) and other materials, and wiring or cabling can vary from very thin wires that may be bundled for passage through a conduit to very thick cables that may not be joined to any other wires or cabling when passed through a conduit. Further, piping, tubing and other larger elements that require pulling must be sufficiently connected to the pulling device to complete the task, whether it will be pulled through a conduit or not. For purposes of the present disclosure, the term "cable" or "cabling" may be used throughout the present disclosure to refer to any type of wire, cable, piping, tubing or similar elongated object that can be inserted and pulled, whether through a conduit or otherwise.

While conduit can be lengthy and provided with curves as necessitated by a building's structure, it can be difficult to pull cabling through even short lengths of conduit. Traditionally, tools such as compression cable pulling devices have been used to pull wire and cable through conduits. The compression cable pulling device would be attached to one end of the wire or cable, wherein the insulation has been stripped to reveal the inner conductor, using a compression press apparatus which would squeeze and deform the compression pulling device onto the wire or cable being pulled. The compressed section is then pulled through the conduit and removed by cutting the wire or cable. Other methods besides using a compression cable pulling device, such as a fish tape, pushing or wiggling cable through conduit, for example, have been tried with generally unsatisfactory results.

Unfortunately, the compression method and other methods of pulling cable through conduit do not always perform effectively, whereas compression pulling devices often separate from the conductor during the process of being pulled through the conduit. Once separated inside the conduit, it can be exceptionally difficult to remove the inserted cable to reinitiate the process. Oftentimes in such situations, the conduit must be removed and/or broken to obtain access to the end of the cable, which can be extremely costly and time-consuming. Additionally, with traditional compression cable pulling devices, a separate, often expensive, and cumbersome, compression device is required to press the compression pulling device body onto the exposed conductor. Alternatively, professionals would bring the wire sections or spools to a local contractor to have the compression body pressed to the conductor, making the process both time consuming and expensive.

The traditional process of pulling cable outside of conduit have been the use of a mechanical compression pulling device that often uses a bolt arrangement to secure the elongated object to the mechanical compression pulling device. Unfortunately, the mechanical compression device can be time consuming both in its installation and removal due to the bolts that are deployed in the mechanical connection of the device. Additionally, the compression of the mechanical device often leads to damaging a section of the elongated object during the pulling process.

SUMMARY OF DISCLOSURE

The present disclosure provides, in part, a self-locking cable securing device, assembly and method that facilitates the secure connection of cable ends for pulling the cabling without damage to the cable and while minimizing risk of detachment during the pulling process.

In various embodiments, the device and assembly can employ a compression member such as a retaining jaw, a tubular barrel, a spacer and a sleeve. In various embodiments, the retaining jaw and spacer are formed as a replaceable cartridge and can include a fastening ring therebetween. The tubular barrel can be provided with a straight or partially tapered interior wall. The sleeve can be internally tapered and the fastening ring can adhere to the cable being inserted. The internally tapered sleeve can be inserted into the barrel, followed by the retaining jaw and the fastening ring. These elements are capable of axial movement within the barrel along the barrel's axis during assembly, for example. The spacer is positioned between the fastening ring and the barrel or a retaining cap.

In various embodiments, the barrel can be provided with an internal or external thread at one end for securely engaging a retaining cap or bottom locking device, and an internal stop shelf at the other end that prevents the internal components from being dislodged under force and provides resistance for the internal sleeve to cause compression of the retaining jaws. One end of the retaining cap can be provided with an internal or external thread for mating with the barrel's thread. In another embodiment, the stop shelf is welded, glued, or provided with threads that mate to the threading on the barrel. The retaining cap can also be formed with a central opening through which a rigid lanyard may extend. In various embodiments, a bulb segment of the rigid lanyard is retained within the interior of the retaining cap such that, as the rigid lanyard is pulled, the bulb segment engages the retaining cap and the full device with barrel, retaining jaws and fastening ring can be pulled as a unit. When a cable is inserted into the opening of the barrel opposite the lanyard, the cable moves past the fastening ring and retaining jaw, at which time the jaw fits around the cable. When the cable is pulled back, the jaw and fastening ring securely engage the cable. In additional embodiments, the retaining cap is glued or welded or is integrated with the barrel as part of a monolithic barrel structure. At such time, a fish tape or other device can be secured to the loop in the rigid lanyard for pulling the cable outside of or through a conduit.

In various embodiments, a retaining ring is inserted between the compression member and the fastening device, and the retaining ring retains a trailing end of the fastening device while providing a mating surface for the compression member. In various embodiments, a staging clip or pusher is employed between the leading edge of the fastening device and the barrel end to prompt the jaws of the fastening device open for receiving an inserted cable, for example. The retaining ring and/or staging clip can be provided as a fracturable or sacrificial component that breaks down upon a single use, according to various embodiments. In various embodiments incorporating the retaining ring, a grip ring is provided between the retaining ring and the compression member to assist with retaining an inserted cable and maintaining alignment of the fastening device.

In various embodiments, the retaining jaw has axial slots that separate different gripping components of the retaining jaw. In various embodiments, one of the slots extends completely along the axial length of the retaining jaw, forming a split in the retaining jaw device. While the elements held within the barrel are axially movable along the interior surface of the barrel, in various embodiments, once the retaining cap and/or bottom locking member is in place, the retaining jaw, fastening ring and spacer do not move axially within the barrel, even when engaging an inserted cable.

BRIEF DESCRIPTION OF THE DRAWINGS

FIG. 24 is a bottom view of an alternative locking ring in accordance with embodiments of the present disclosure.

FIG. 25 is a cross-sectional view taken along the line 25-25 of FIG. 24.

FIG. 26 is a front view of the locking ring of FIG. 24.

FIG. 28 is a front cross-sectional view of the device of FIG. 27.

FIG. 29 is an enlarged view of encircled portion 29-29 of FIG. 28.

FIG. 30 is an enlarged view of encircled portion 30-30 of FIG. 28.

FIG. 36 is a front view of a retaining jaw in accordance with embodiments of the present disclosure.

FIG. 37 is a cross-sectional view taken along the line 37-37 of FIG. 36.

FIG. 38 is a perspective view of the retaining jaw of FIG. 36.

FIG. 46 is a bottom view of a cartridge in accordance with embodiments of the present disclosure.

FIG. 47 is a cross-sectional view taken along the line 47-47 of FIG. 46.

FIG. 48 is an enlarged view of encircled portion 48-48 of FIG. 47.

FIGS. 49 and 50 are depictions of a cartridge retaining element in accordance with embodiments of the present disclosure.

DETAILED DESCRIPTION OF EMBODIMENTS

Figure 1:
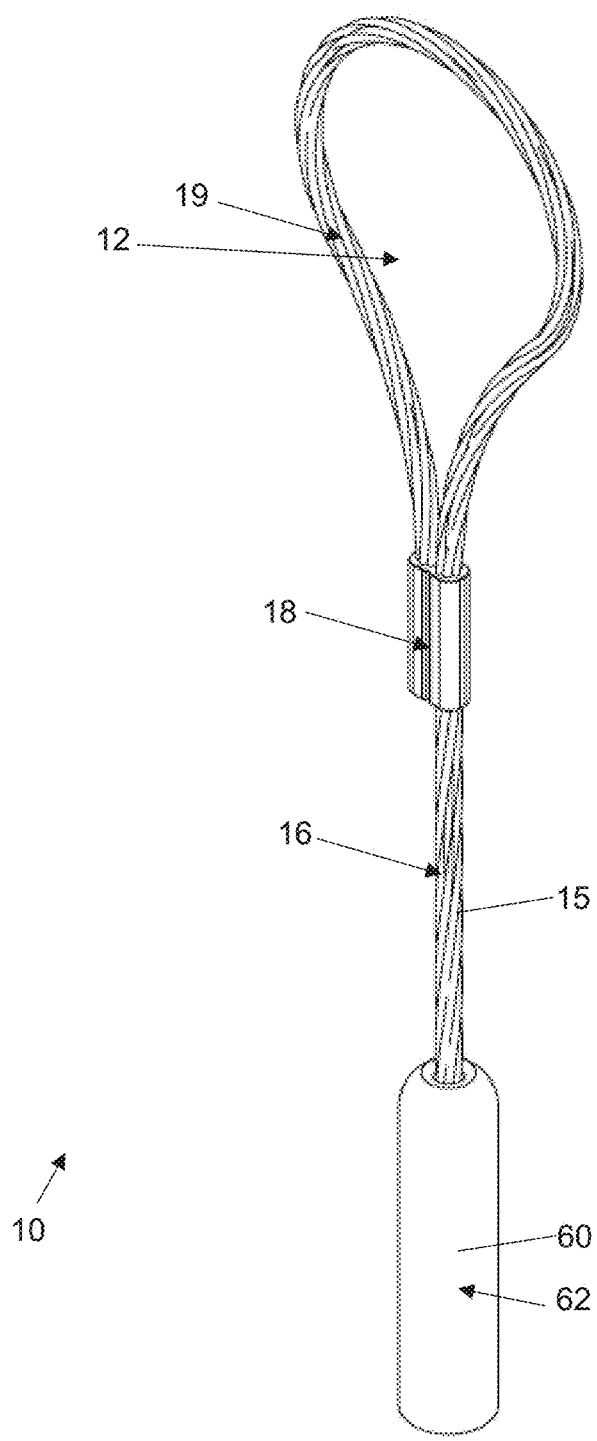
FIG. 1 is a front perspective view of an embodiment of a cable securing device in accordance with the present disclosure.
Figure 2:
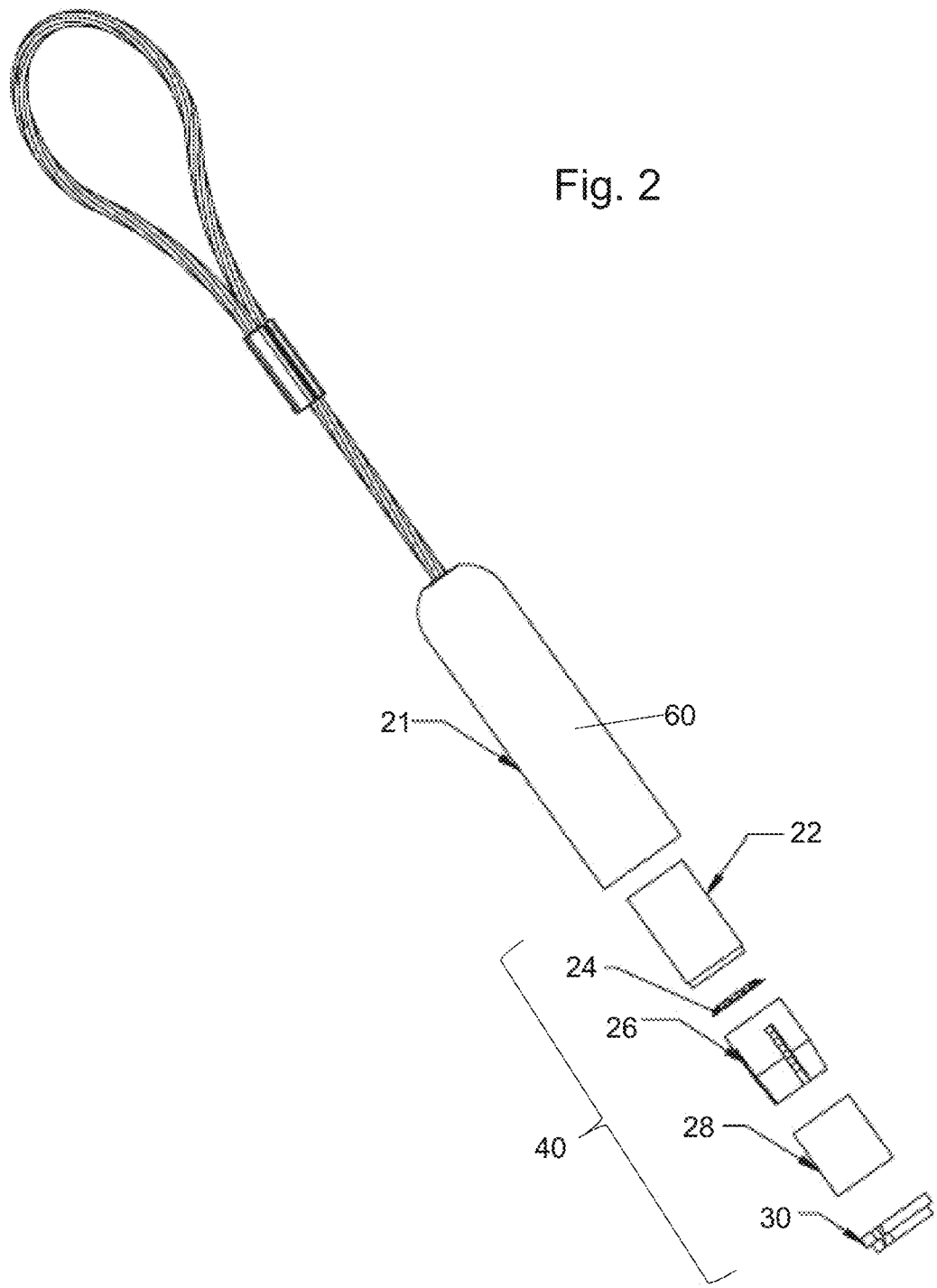
FIG. 2 is an exploded perspective view of an embodiment of a cable securing device in accordance with the present disclosure.
Figure 3:
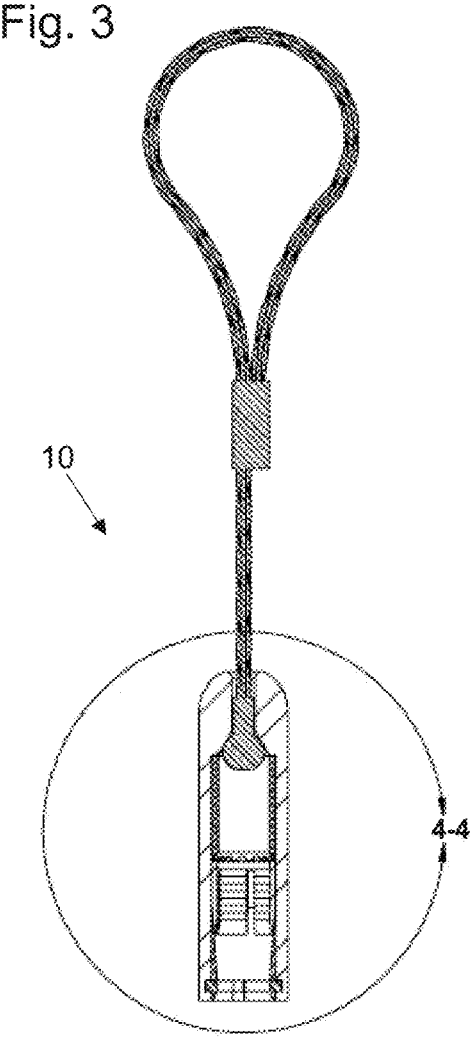
FIG. 3 is a front view of the device of FIG. 1 in cross-section.
Figure 4:
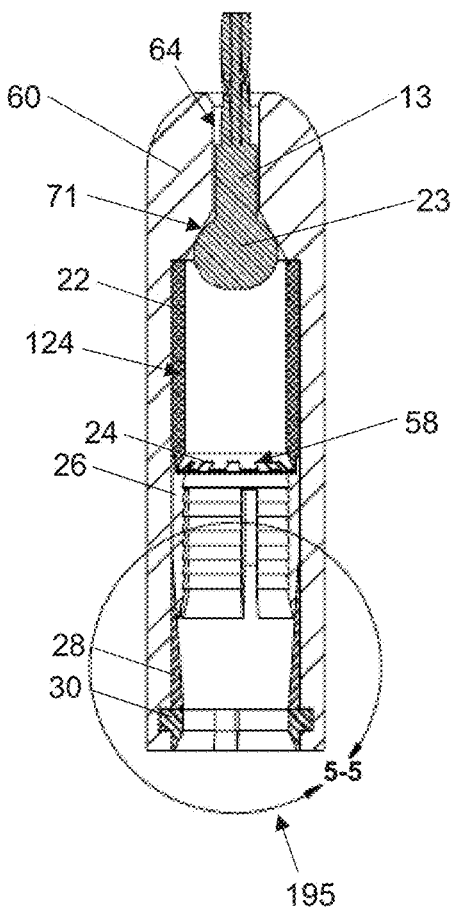
FIG. 4 is an enlarged view of encircled portion 4-4 of FIG. 3.

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

It will be appreciated that reference to "a", "an" or other indefinite article in the present disclosure encompasses one or more than one of the described element. Thus, for example, reference to teeth may encompass one or more teeth or sets of teeth, and so forth.

In the cable securing device 10 according to embodiments of the present disclosure as shown in FIGS. 1 through 50, elements as shown include: a bottom locking device 30, a barrel 60 and a cable receiving component 40. The cable receiving component 40 can include a spacer 22, a fastening ring 24, a retaining jaw 26 and a sleeve 28, or a subset thereof. In various embodiments, the cable receiving component 40 can further include the bottom locking device 30. The cable receiving component 40 may be formed as individual elements joined together or may be provided as an integrated cartridge with two or more of the elements as shown in the drawings.

As shown in FIGS. 1 through 4, a lanyard 15 is provided with a body segment 16, shank ball segment 23, clasp 18 and end loop segment 19. The lanyard 15 may or may not be considered part of the cable securing device 10 depending upon the nature of the embodiments of the present disclosure. In various embodiments, the shank ball segment 23 is integrally formed with the body segment 16 as at 13 so as to provide a monolithic structure, and the end loop segment 19 can be crimped or clasped as with clasp 18 so as to form a loop 12, which facilitates the secure connection of a fish tape or other external device having a latch or other mechanism securable to the loop segment 19 for pulling, as described in more detail hereafter. In various embodiments, the lanyard can be made of steel or other rigid material. The shank ball segment 23 is formed of a size appropriate to engage lower neck portion (e.g., 71) of an interior surface 64 of the barrel 60 (see FIG. 4, for example) or interior surface portion (e.g., 522) of a separate retainer cap 50 (see FIG. 32, for example). This facilitates a secure engagement such that when the lanyard 15 is pulled, it will pull the barrel 60 and its contents during operation.

As shown in FIGS. 6, 7, 14, 15, 22, 23 and 33, for example, embodiments of the barrel 60 can be formed as a monolithic, single-body component with an exterior surface 62 and an interior surface 64 defining an interior cavity 63 extending axially therethrough. The exterior surface 62 can be substantially cylindrical, or tubular, as shown, with an optionally rounded upper exterior surface 65. An interior edge surface 68 of the barrel 60 extends radially inwardly from the interior surface 64 to lower neck portion 71 of the interior surface 64. The interior edge surface 68 provides a structural support for the spacer 22 and/or embodiments of the cartridge during operation as described elsewhere herein. In various embodiments, a portion 73 of the interior surface 64 of the barrel 60 extends axially and radially inwardly from the exterior surface 62 to an upper neck portion 75, which extends axially to the lower neck portion 71. The lower neck portion extends radially outwardly and axially away from the upper neck portion 75 to the interior edge surface 68. The upper 75 and lower 71 neck portions provide surfaces for the shank ball segment 23 and element 13 to engage during operation.

In the embodiments of the barrel 60 as shown in FIGS. 6, 7, 14 and 15, the barrel interior surface 64 extends axially from the interior edge surface 68 to a bottom locking device receiving area 100. In the embodiment shown in FIGS. 6 and 7, a barrel end surface 66 extends radially inwardly from the exterior surface 62 to an axially extending inner radial lip 67. The bottom locking device receiving area 100 can include the radial lip 67, a first wall 77 extending radially outwardly from the interior surface 64 to an axially extending interior wall 78, from which a second wall 79 extends radially inwardly to the radial lip 67. Such walls 77, 78, 79 provide a supporting structure for receiving embodiments of a bottom locking device 30 as described elsewhere herein. In the embodiment shown in FIGS. 14 and 15, the bottom locking device receiving area 100 includes a first wall 77 extending radially outwardly from the interior surface 64 and a thread 81 extending from the first wall 77 to the barrel end surface 66. This embodiment provides proper connection structure for receiving other embodiments of a bottom locking device 30 as described elsewhere herein.

Figure 14:
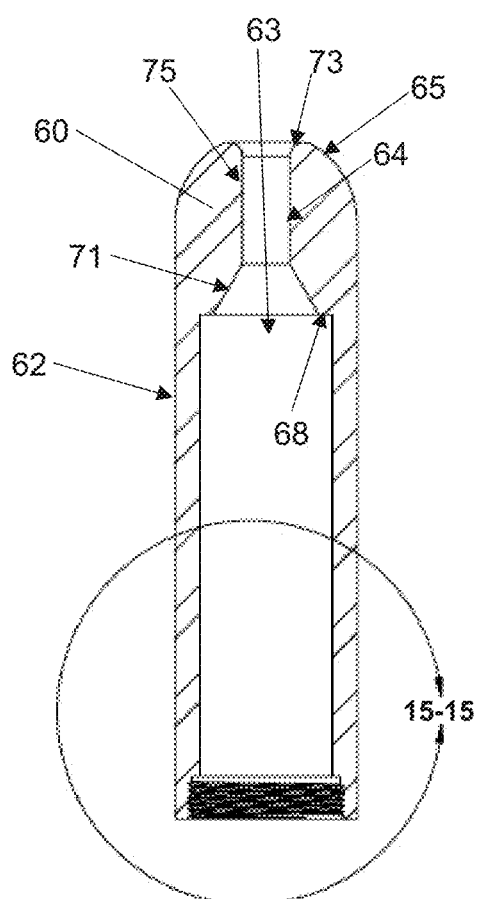
FIG. 14 is a cross-sectional view of the barrel member of FIGS. 12 through 13.
Figure 15:
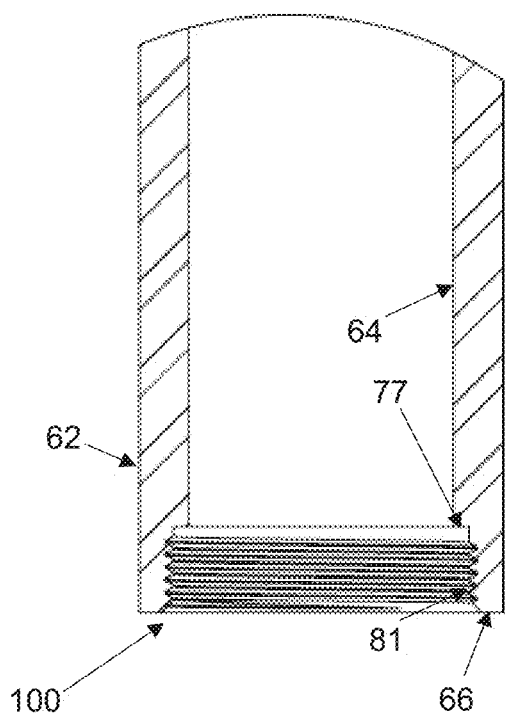
FIG. 15 is an enlarged view of encircled portion 15-15 of FIG. 14.
Figure 16:
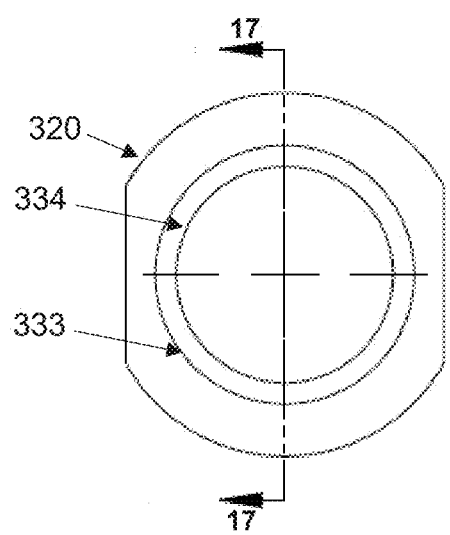
FIG. 16 is a bottom view of a locking ring in accordance with embodiments of the present disclosure.
Figure 17:
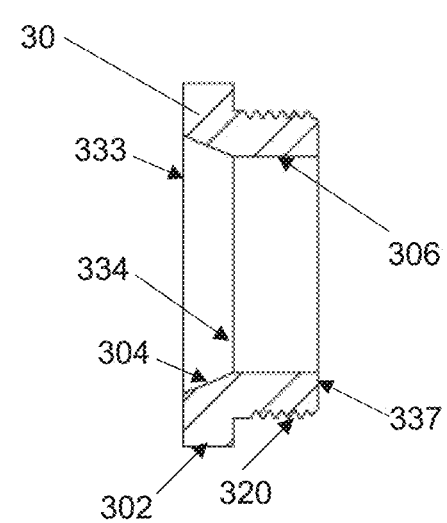
FIG. 17 is a cross-sectional view taken along the line 17-17 of FIG. 16.
Figure 18:
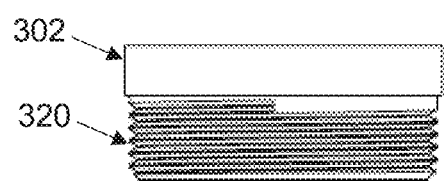
FIG. 18 is a front view of the locking ring of FIG. 16.
Figure 19:
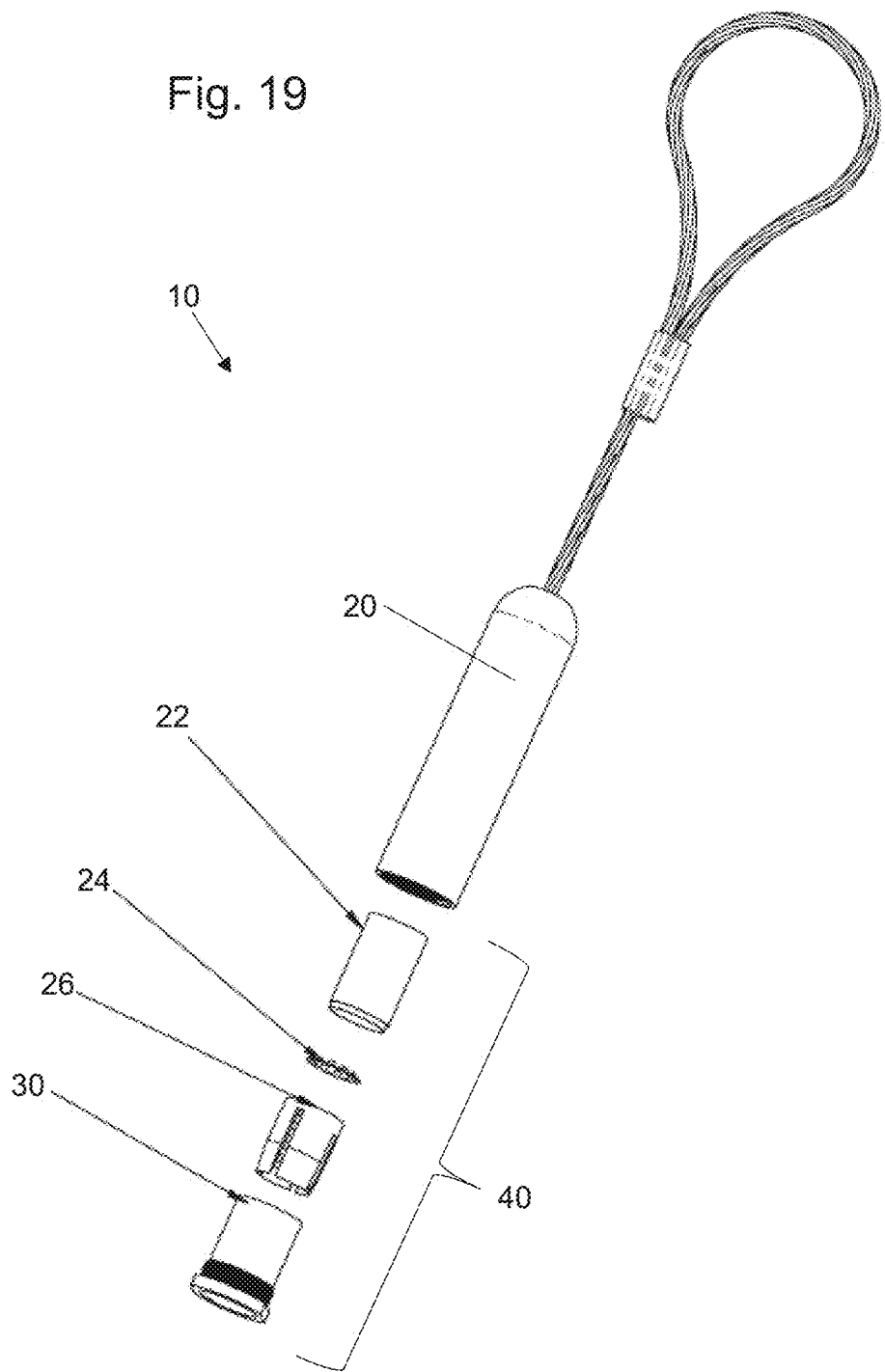
FIG. 19 is an exploded perspective view of an alternative embodiment of a cable securing device in accordance with the present disclosure.
Figure 20:
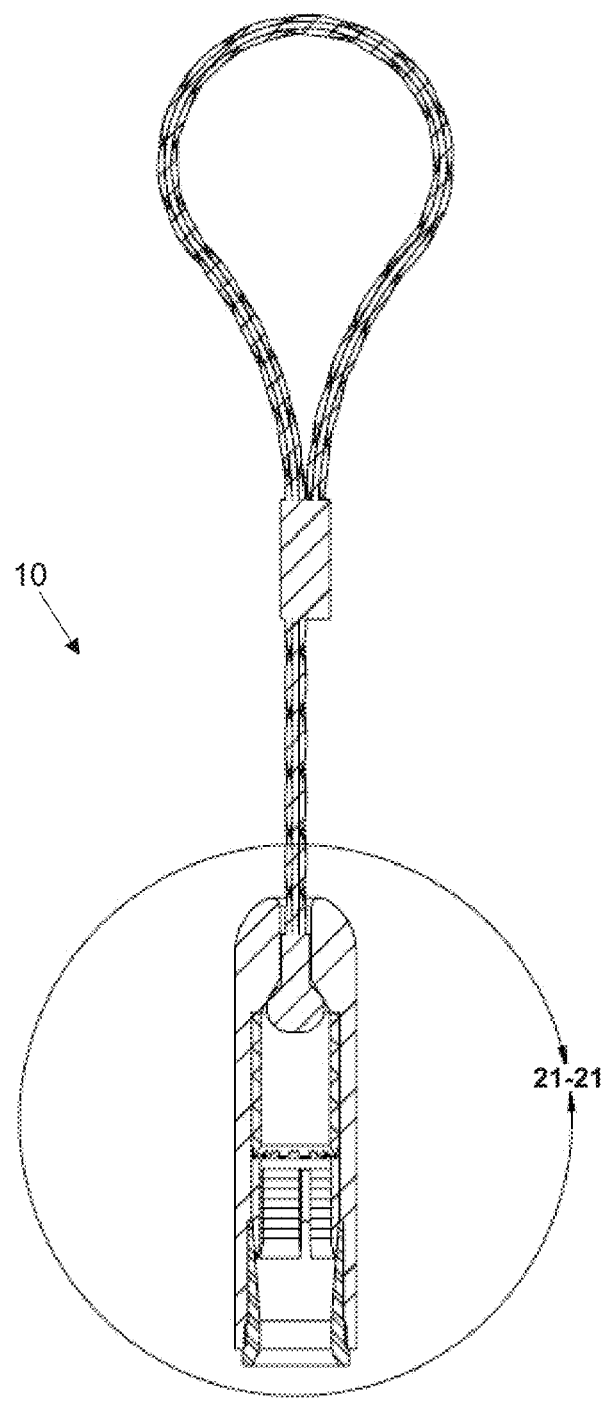
FIG. 20 is a front view of the device of FIG. 19 in cross-section.
Figure 21:
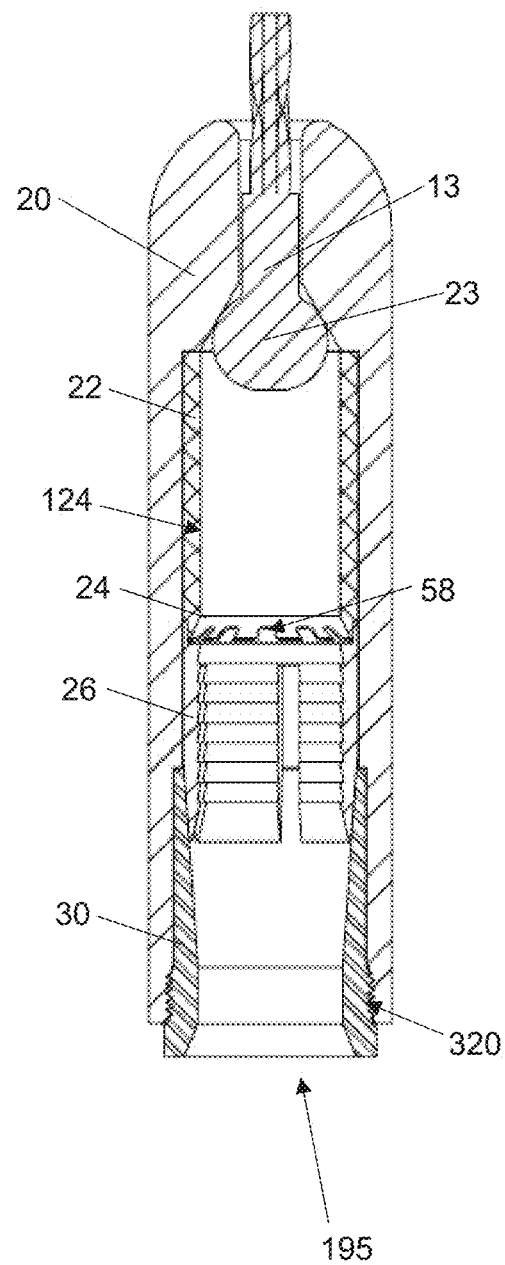
FIG. 21 is an enlarged view of encircled portion 21-21 of FIG. 20.
Figure 22:
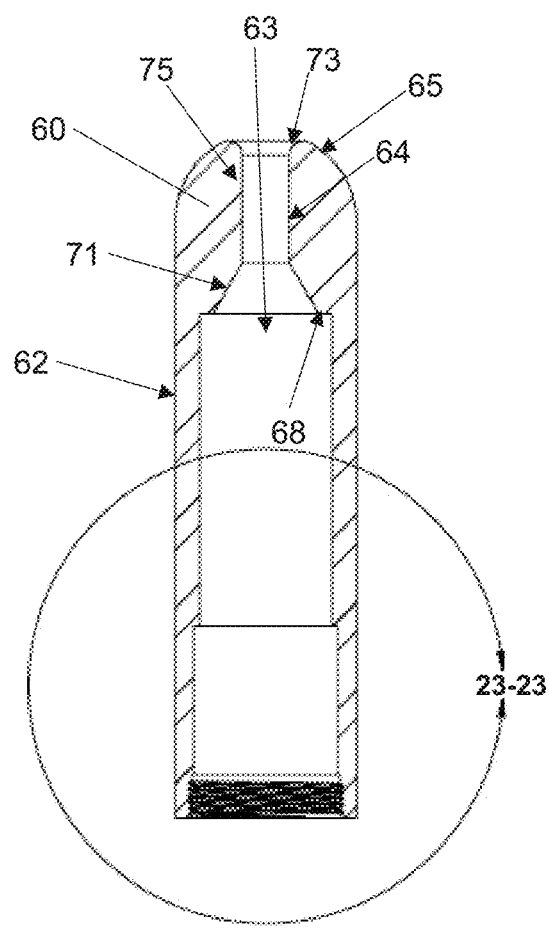
FIG. 22 is a cross-sectional view of the barrel member of FIGS. 20 through 21.
Figure 23:
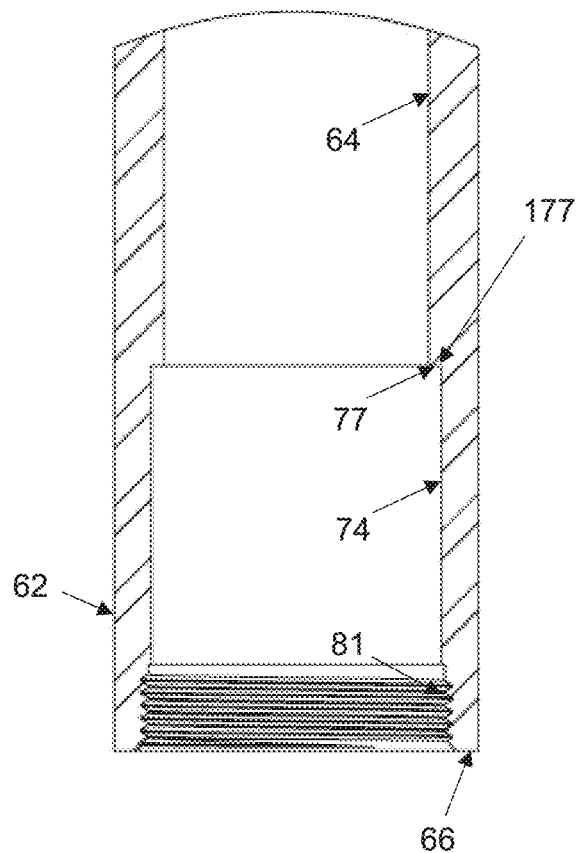
FIG. 23 is an enlarged view of encircled portion 23-23 of FIG. 22.
Figure 27:
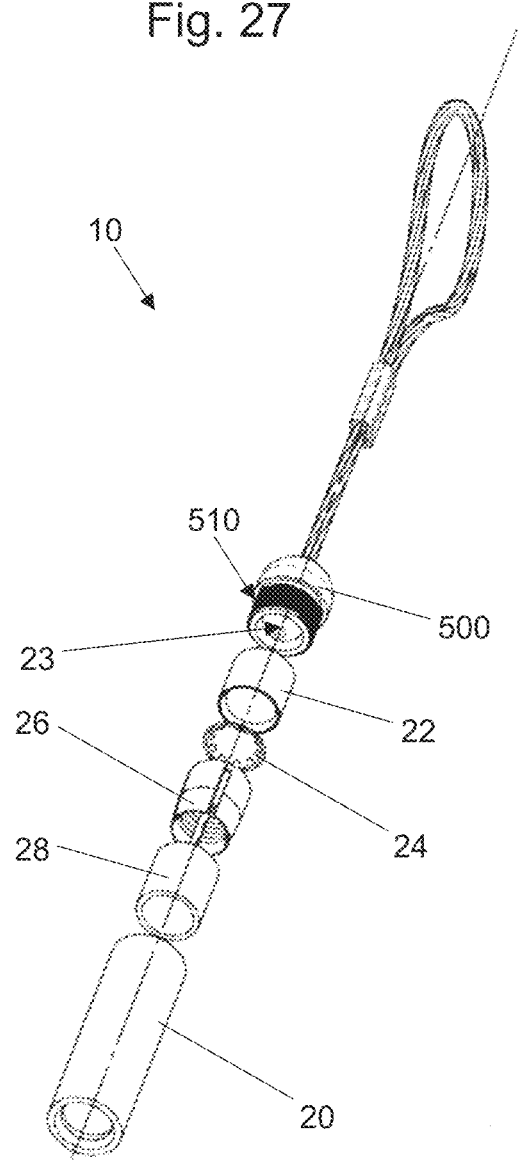
FIG. 27 is an exploded perspective view of an alternative embodiment of a cable securing device in accordance with the present disclosure.
Figure 31:
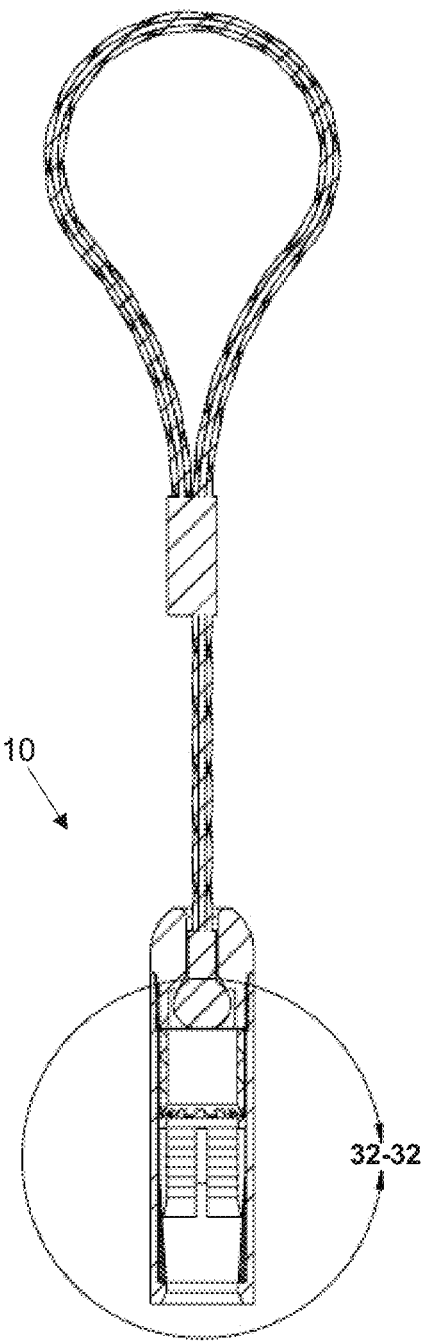
FIG. 31 is a front cross-sectional view of the device of FIG. 27.
Figure 32:
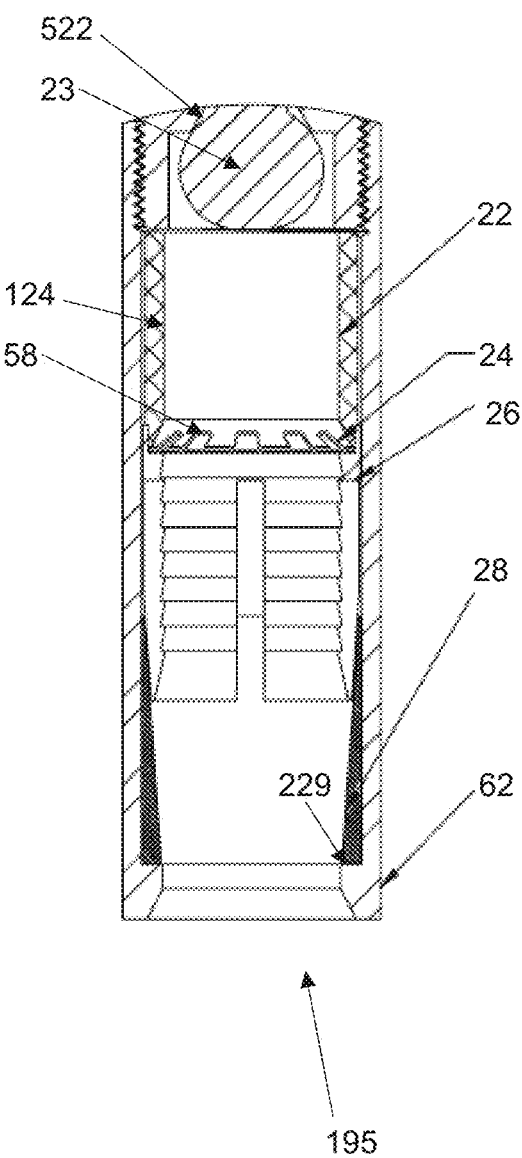
FIG. 32 is an enlarged view of encircled portion 32-32 of FIG. 31.
Figure 33:
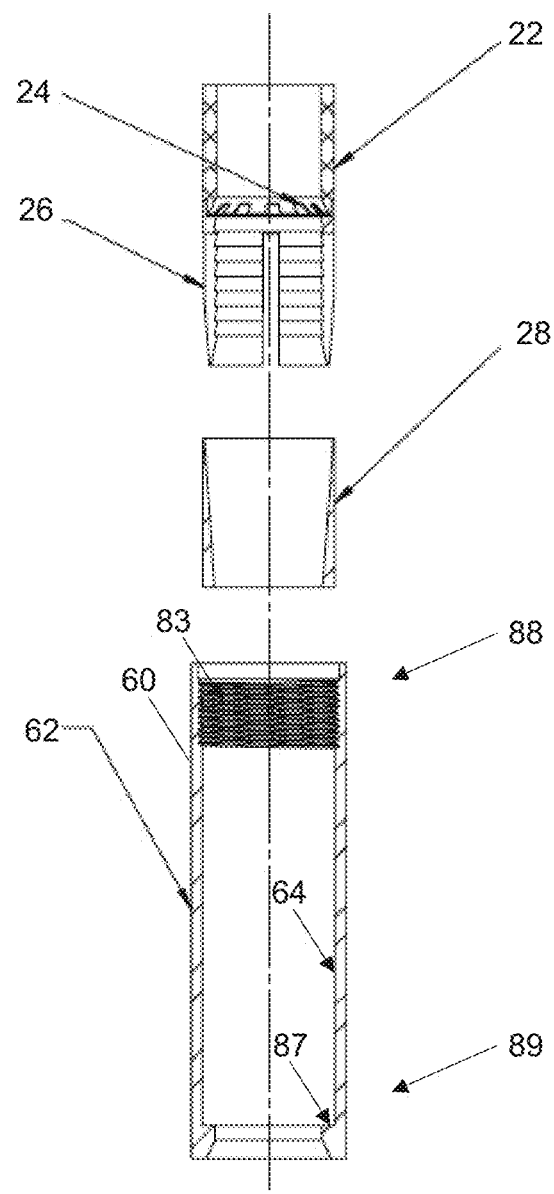
FIG. 33 is an exploded front view in cross-section of elements of a cable securing device in accordance with embodiments of the present disclosure.

The embodiment of the barrel 60 as shown in FIGS. 22 and 23 is similar to the embodiment of FIGS. 14 and 15; however, a bottom portion 74 of the interior surface 64 extends axially outwardly from the radially outer edge 177 of the first wall 77 to the thread 81. Such form provides supporting structure for receiving alternative embodiments of a bottom locking device 30 as described elsewhere herein. In still another embodiment as shown in FIG. 33, the barrel 60 is formed with a thread 83 proximate the top end 88 and a radially inwardly extending support ledge 87 proximate the bottom end 89. The support ledge 87 provides structural support to a sleeve 28 and/or cartridge in accordance with various embodiments of the present disclosure. In various embodiments, the barrel 60 is formed of steel or other rigid material.

Figure 39:
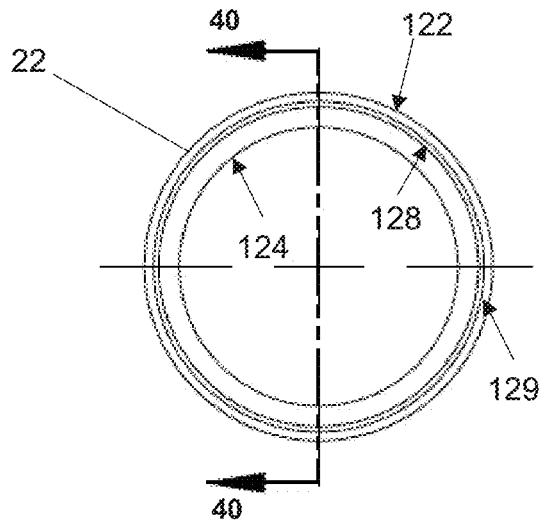
FIG. 39 is a bottom view of a spacer in accordance with embodiments of the present disclosure.
Figure 40:
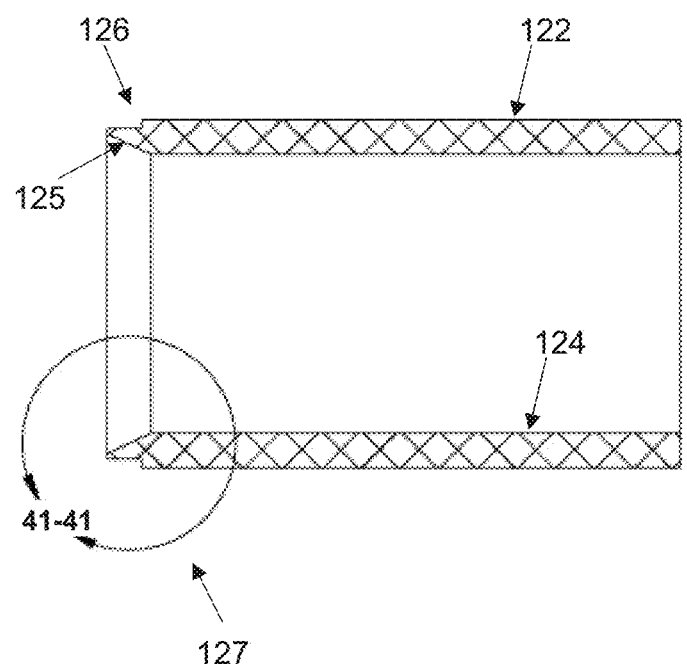
FIG. 40 is a cross-sectional view taken along the line 40-40 of FIG. 39.
Figure 41:
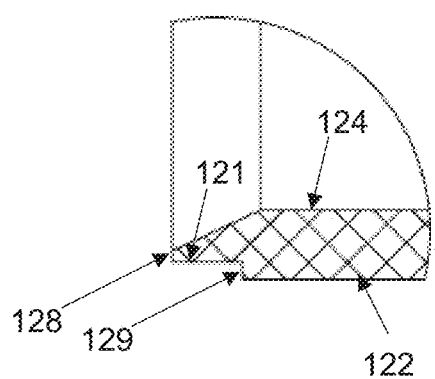
FIG. 41 is an enlarged view of encircled portion 41-41 of FIG. 40.

As shown in the drawings, particularly FIGS. 39 through 41, for example, embodiments of the spacer 22 can be formed as a monolithic, single-body component with an exterior surface 122 and an interior surface 124 defining an interior cavity extending axially therethrough. The exterior surface 122 can be substantially cylindrical, or tubular, as shown, with embodiments including a notch 126 at one axial end 127 for engaging the retaining jaw 26 as described elsewhere herein. The notch 126 can be formed as a first platform 129 extending radially inwardly from the exterior surface 122 to an end portion 121 of the exterior surface 122 extending axially outwardly to a radially inwardly extending second platform 128. An angled inner ridge 125 extends axially and radially inwardly from the second platform 128 to the substantially cylindrical interior surface 124. The angled inner ridge 125 thus forms a frustoconical portion of the interior surface 124 of the spacer 22. In various embodiments, the spacer 22 is formed of steel or other rigid material and is resilient and not axially compressible.

Figure 34:
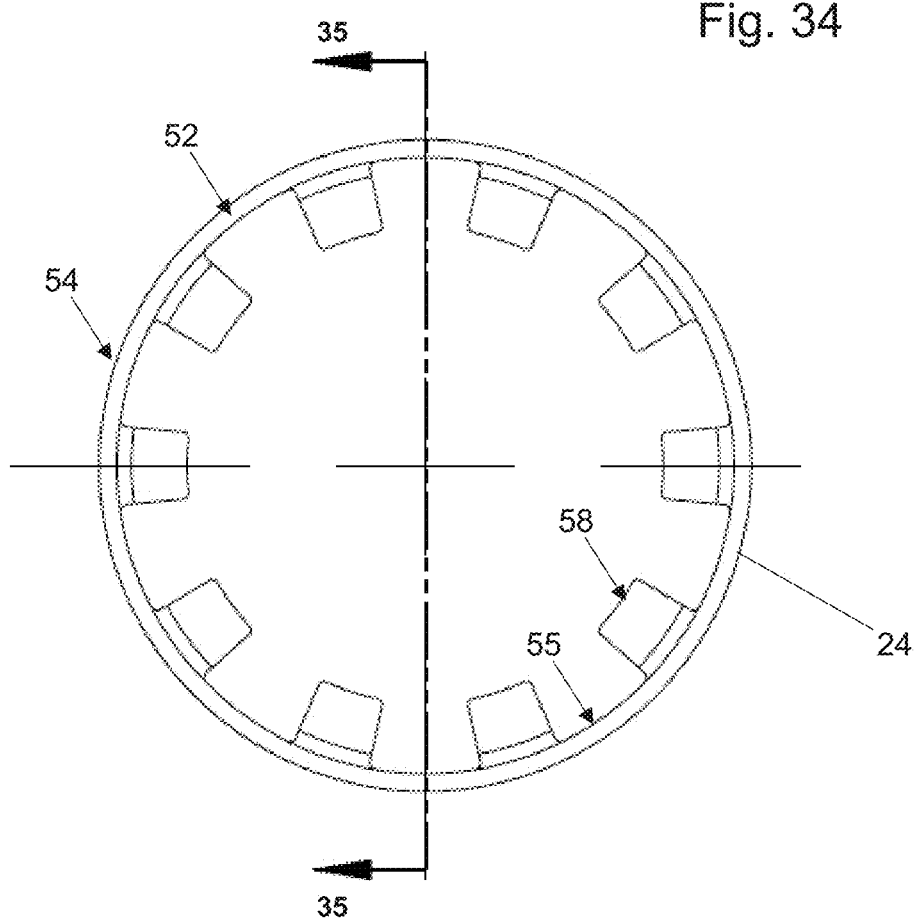
FIG. 34 is a front view of a fastening ring in accordance with embodiments of the present disclosure.
Figure 35:
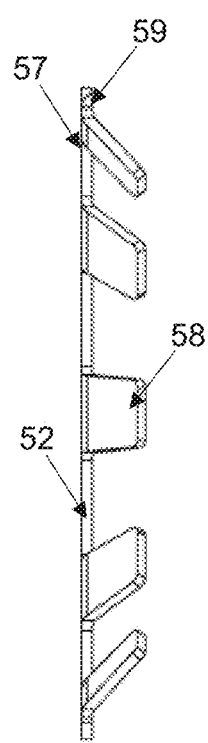
FIG. 35 is a cross-sectional view taken along the line 35-35 of FIG. 34.

As shown in the drawings, particularly FIGS. 34 and 35, for example, embodiments of the fastening ring 24 can be formed as a monolithic element including a fastening ring rim or base 52 with a radially outer edge 54 and a radially inner surface 55 defining a fastening ring cavity. The fastening ring 24 can be an integral, unsplit ring or can be a split ring member. In the embodiments where the fastening ring is a split ring, the fastening ring can include two circumferential end points (not shown) that do not connect, with fixture points for handling and compressing the fastening ring, such that a tool designed to hold the fastening ring at the fixture points can more easily handle and compress the fastening ring in order to assist with assembly or disassembly. In this embodiment, and once compressed, the fastening ring is easily insertable into the barrel 60 by releasing the hold on the fixture points, thereby allowing the fastening ring to expand such that the radially outer edge 54 engages the interior surface 64 of the barrel 60. In various embodiments, the fastening ring 24 can comprise a spring steel formulation, for example, that enables the fastening ring to be malformed during installation, while springing back into its originally manufactured position once installed. A first face or radially extending surface 59 of the base 52 is positioned in operational contact with the trailing edge of the retaining jaw 24 and a second face or radially extending surface 57 is positioned adjacent the spacer 22 when installed and during operation.

The fastening ring 24 is capable of grabbing an inserted cable's surface via two or more teeth 58. As shown in FIGS. 34 and 35, the fastening ring 24 can be formed with one or more bifurcated or square edged teeth 58 extending axially and radially inwardly from the radially inner surface 55 of the fastening ring base 52. As shown in FIGS. 4, 13, 21 and 32, for example, the teeth 58 extend toward the inner surface 124 of the spacer 22 when at rest. The teeth 58 of the fastening ring 24 can extend at various angles from the base axis as measured when the teeth are at rest position and are not stressed by the insertion of a cable, for example. The number of teeth can readily vary in number and size. In various embodiments, the fastening ring teeth 58 are angled radially and axially inwardly from the substantially cylindrical perimeter of the fastening ring 24, toward the spacer 22 and away from the retaining jaw 24, such that when a cable is inserted, the teeth 58 first extend radially outwardly to permit the cable to pass through, and then exert a pressure against the cable as it settles to discourage the cable from slipping or moving back out of the barrel 60. In various embodiments, each of the fastening ring teeth 58 is formed with a gripping edge extending radially inwardly into the barrel interior cavity to engage the cable during operation. In various embodiments, the teeth 58 extend toward or to an angled inner ridge 125 of the inner surface 124 of the spacer 22 when stressed by the insertion of a cable, and then flex back in the opposite direction after the cable has been inserted to thereby grip the inserted cable and resist any axial movement of the cable back out of the barrel 60. The teeth 58 may or may not contact the angled inner ridge 125 of the spacer 22 during operation. In various embodiments, the fastening ring 24 assists in allowing the device 10 to securely engage an inserted cable while also preventing or minimizing any drifting of the cable once inserted, which can result in an unsatisfactory grip on an inserted cable.

As shown in the drawings, particularly FIGS. 36 through 38, for example, embodiments of the retaining jaw 26 can be provided in various forms and, in various embodiments, the retaining jaw 26 is formed of steel or other rigid material. The retaining jaw 26 can be provided as a unitary, monolithic element with an outer surface 260, an inner surface 262, an axially exterior edge or leading edge 264 at its first axial end and a trailing edge at its second axial end in the form of an axially interior, radially extending end wall 265. The outer surface 260 can be formed with an axially interior segment 266 and an axially exterior segment 267, wherein the axially interior segment 266 is substantially cylindrical and the axially exterior segment 267 is substantially frustoconical. In various embodiments, the axially exterior segment 267 of the outer surface 260 extends at an angle so as to mate in sliding engagement with the substantially frustoconical surface of the sleeve 28 during operation. The axially interior segment 266 can further be formed with a groove or indentation 268 for mating with the notch 126 of the spacer 22 as described elsewhere herein. The indentation 268 can be formed as an axially extending wall 269 extending axially from the end wall 265 to a radially extending platform 270. It will be appreciated that the cable receiving component 40 can be provided as individual elements (e.g., spacer 22, fastening ring 24 and retaining jaw 26) joined together or as a single integrated cartridge, regardless of whether formed with an indentation 268.

As further shown in FIGS. 36 through 38, the retaining jaw 26 can be formed with compression channels or slots 272 defined by radially extending jaw walls 274 and axially extending jaw rims 276. The jaw rims 226 can be formed in the axially interior segment 266 of the outer surface 260 of the retaining jaw 26 and can extend radially to the inner surface 262 of the retaining jaw 26. The jaw walls 274 can extend axially outwardly from the jaw rims 226 to the exterior edge 264 of the retaining jaw 26. Thus, the slots 272 extend through the axially exterior segment 267 of the outer surface 260 of the retaining jaw 26 and a portion of the axially interior segment 266 of the outer surface 260 of the retaining jaw 26. In various embodiments, one of the slots can extend fully through the axially interior segment 266 of the outer surface 260 of the retaining jaw 26 to form a split, which can assist with manipulating the retaining jaw 26 during installation, as the split results in less resistance to radial compression of the retaining jaw 26 such that the retaining jaw 26 may more readily be inserted into the barrel interior.

The slots 272 form multiple jaw members, as shown in FIGS. 36 through 38. The number of jaw members can vary depending upon the embodiment. For example, as shown in FIG. 38, four jaw members 255, 256, 257 and 258 are formed. Regardless of number, each jaw member can be formed with a respective leading edge corresponding to exterior edge 264 at the axially outer end of the jaw member and a gripping segment such as jaw teeth 250. The jaw teeth 250 can be formed with riser segments 251 and radially inwardly extending ridges 252, wherein the riser segments 251 extend radially and axially inwardly from the jaw walls 274 and wherein the riser segments 251 and ridges 252 meet at a radially inner edge 253 which forms a sharpened peak for pinching an inserted cable. In various embodiments, the riser segments 251 are formed with a greater surface area than the ridges 252, which assists in facilitating the insertion of a cable while also providing for significant gripping force after the cable has been inserted so as to resist movement of the cable axially outwardly of the barrel 60.

Figure 42:
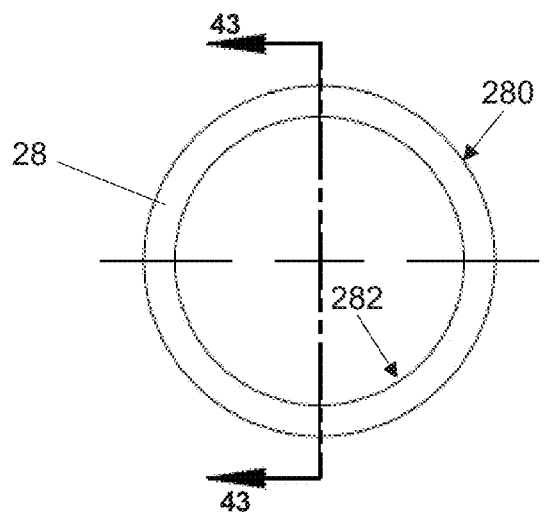
FIG. 42 is a bottom view of a sleeve in accordance with embodiments of the present disclosure.
Figure 43:
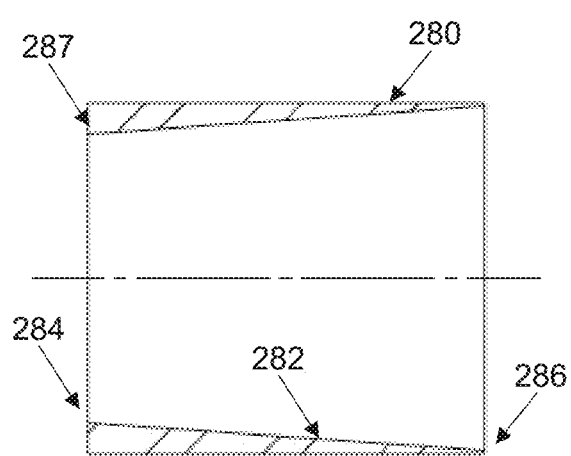
FIG. 43 is a cross-sectional view taken along the line 43-43 of FIG. 42.
Figure 44:
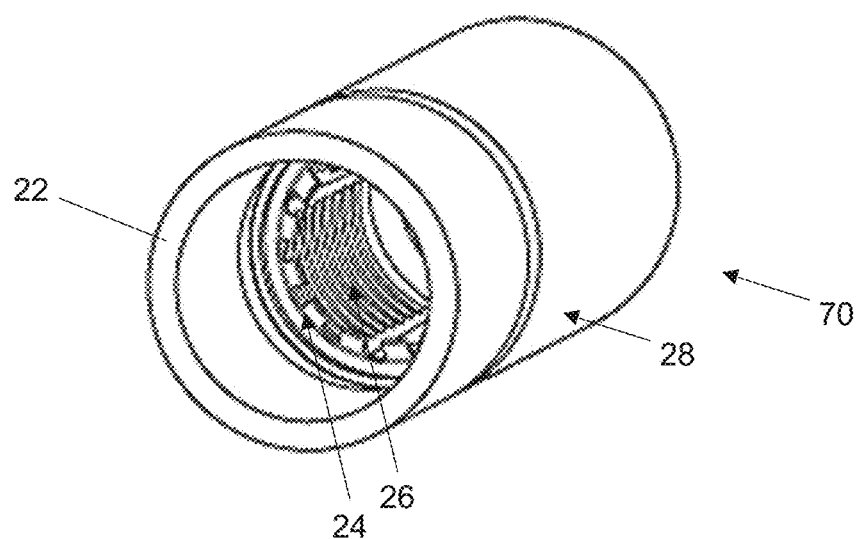
FIG. 44 is a perspective view of an embodiment of a cartridge in accordance with the present disclosure.
Figure 45:
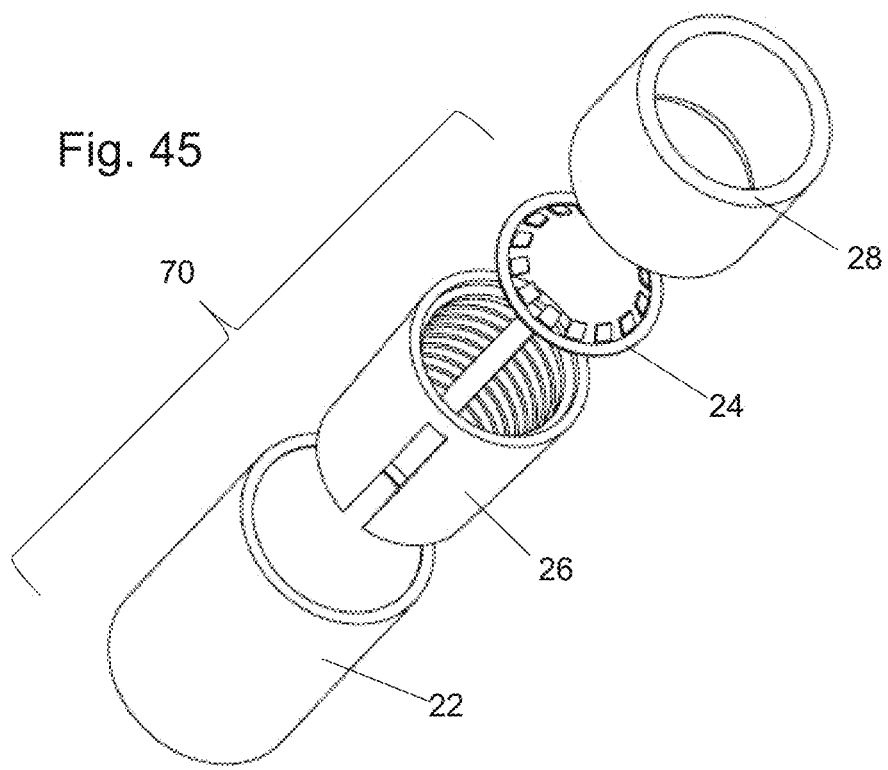
FIG. 45 is an exploded perspective view of an embodiment of a cartridge assembly in accordance with the present disclosure.

As shown in the drawings, particularly FIGS. 42 and 43, for example, embodiments of the sleeve 28 can be provided in various forms and can be formed of steel or other rigid material. The sleeve 28 can be formed with a substantially cylindrical outer surface 280 and a substantially frustoconical inner surface 282. The inner surface 282 extends from a sleeve primary end 284 having a radially narrower depth to a sleeve secondary end 286 having a radially wider depth, with a radially extending wall 287 at the sleeve primary end 284 that mates with a bottom locking device 30 or a support ledge 87 of the barrel 60 depending upon the embodiment as disclosed herein. The inner surface 282 at the sleeve secondary end 286 mates with the axially exterior segment 267 of the outer surface 260 of the retaining jaw 26 during operation.

Figure 5:
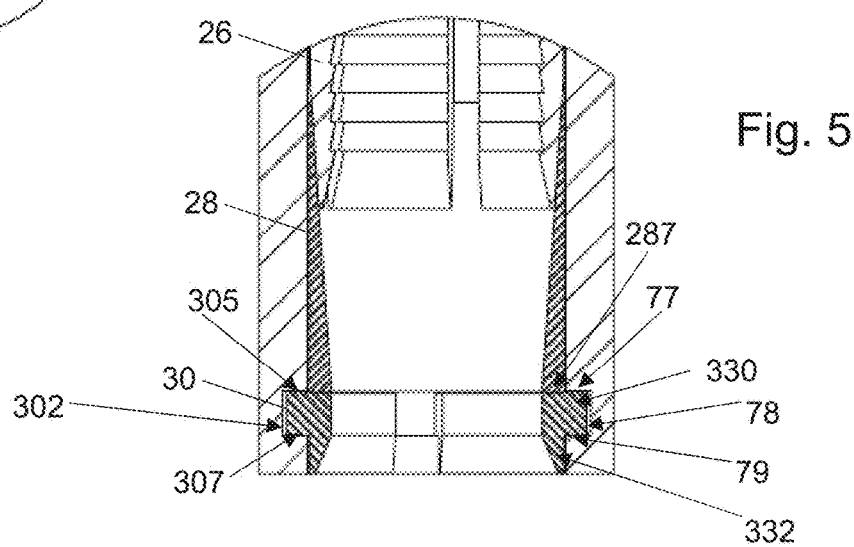
FIG. 5 is an enlarged view of encircled portion 5-5 of FIG. 4.
Figure 6:
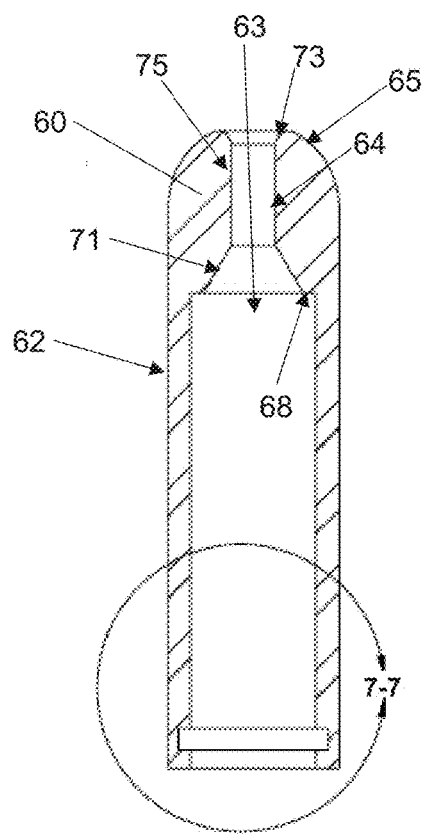
FIG. 6 is a cross-sectional view of the barrel member of FIGS. 3 through 5.
Figure 7:
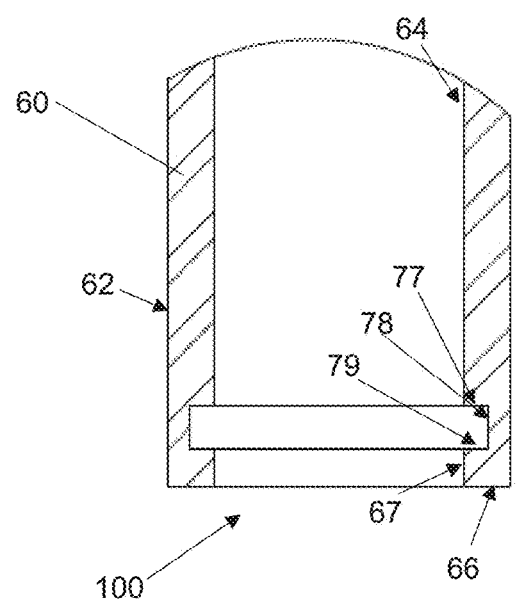
FIG. 7 is an enlarged view of encircled portion 7-7 of FIG. 6.
Figure 8:
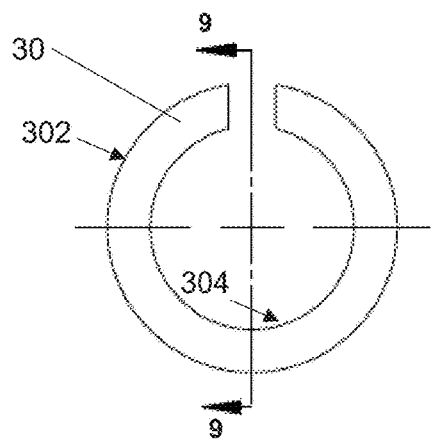
FIG. 8 is a bottom view of a bottom locking ring in accordance with embodiments of the present disclosure.
Figure 9:
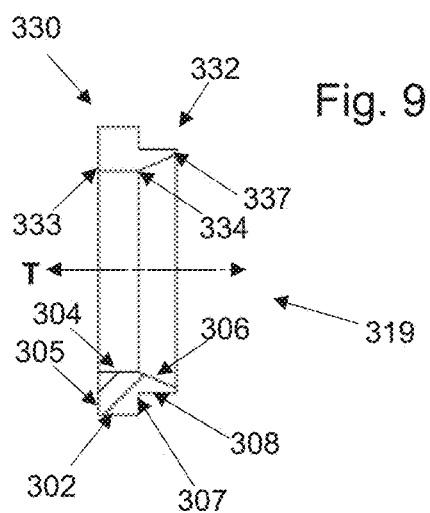
FIG. 9 is a cross-sectional view taken along the line 9-9 of FIG. 8.
Figure 10:
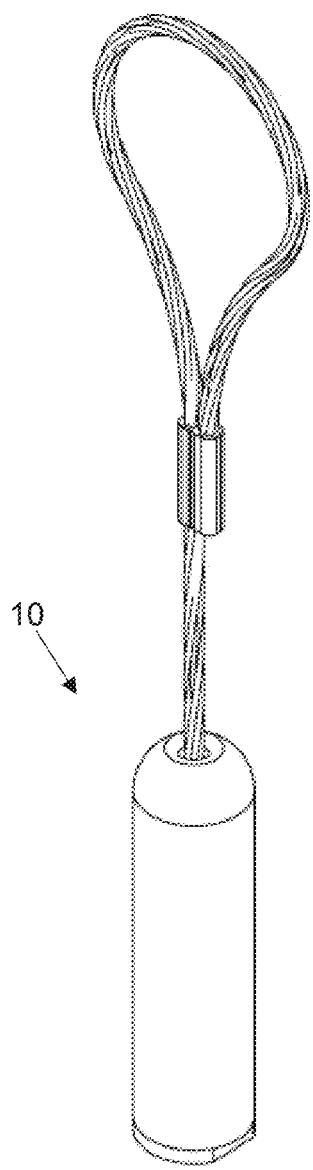
FIG. 10 is a front perspective view of an alternative embodiment of a cable securing device in accordance with the present disclosure.
Figure 11:
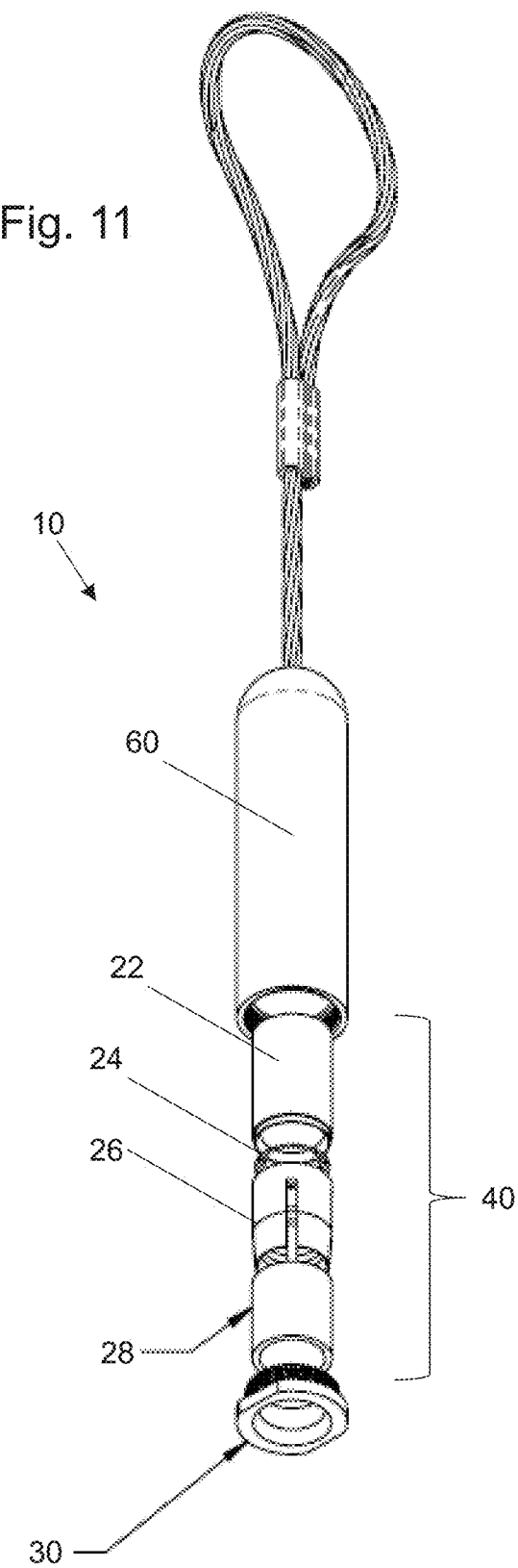
FIG. 11 is an exploded perspective view of an alternative embodiment of a cable securing device in accordance with the present disclosure.
Figure 12:
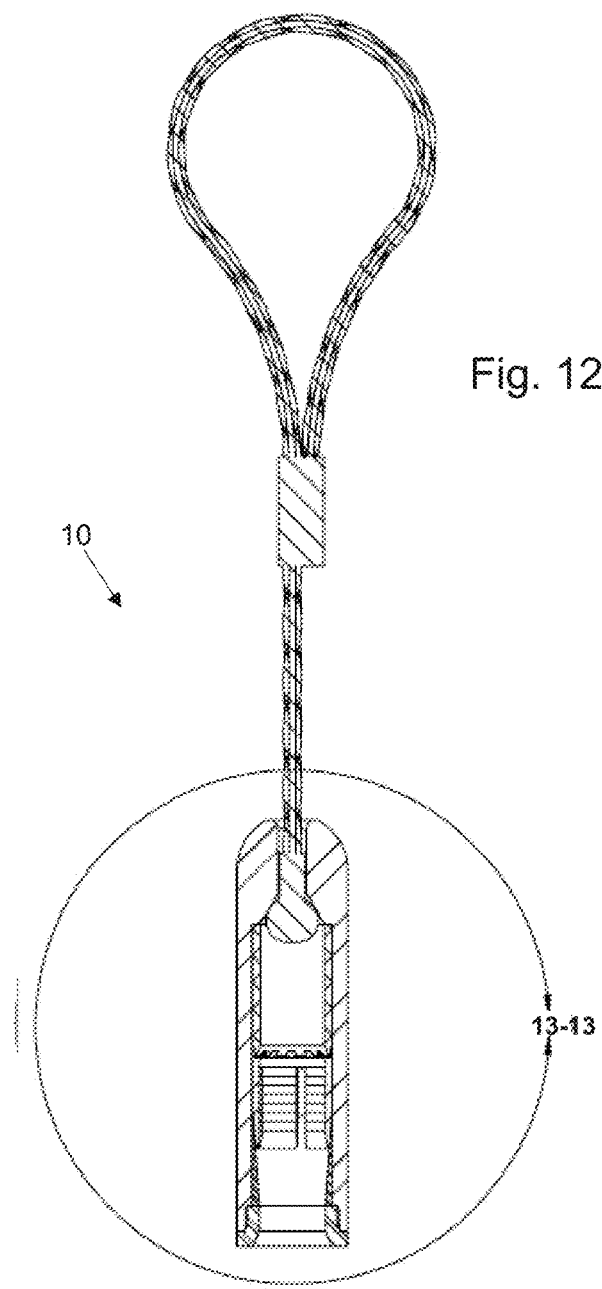
FIG. 12 is a front view of the device of FIG. 11 in cross-section.
Figure 13:
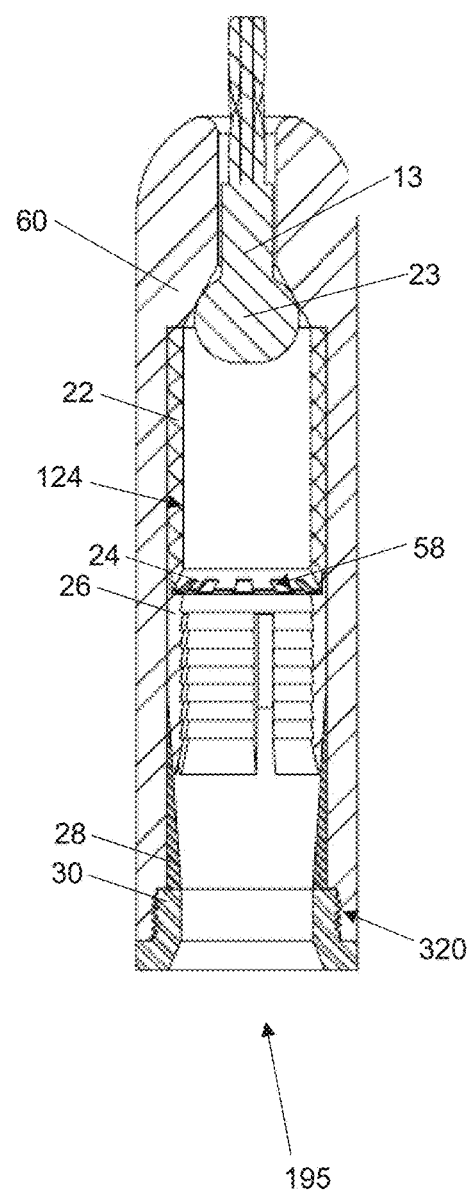
FIG. 13 is an enlarged view of encircled portion 13-13 of FIG. 12.

Various embodiments of the bottom locking device 30 are shown in FIGS. 2 through 26. As shown in FIGS. 4, 5, 8 and 9, for example, the bottom locking device 30 includes a head 330 integrally formed with a ring-shaped body 332, wherein the head includes a head radially exterior surface 302, a head radially interior surface 304, a head axially exterior surface 305 and a head axially interior surface 307. When installed, the head axially exterior surface 305 is maintained in contact with the first wall 77 of the bottom locking device receiving area 100 and the radially extending wall 287 at the primary end 284 of the sleeve 28, as shown in FIG. 5. When installed, the head radially exterior surface 302 is further maintained in contact with the axially extending interior wall 78 of the bottom locking device receiving area 100 and the head axially interior surface 307 is maintained in contact with the second wall 79 of the bottom locking device receiving area 100. Such arrangement keeps the bottom locking device 30 of FIGS. 4, 5, 8 and 9 in secure engagement with the barrel 60 and further provides secure retention of the sleeve 28 during operation. In such embodiments, the bottom locking device 30 can be snapped into place in the barrel 60.

The body 332 of the bottom locking device 30 includes a body interior surface 306 and a body radially exterior surface 308. The head radially interior surface 304 and the body interior surface 306 form an opening 319 extending along an axis T through the head 330 and ring-shaped body 332. In various embodiments, the head radially interior surface 304 is substantially cylindrical. In various other embodiments, the head radially interior surface 304 extends from the axially outer edge 333 at the radially innermost part of the head axially exterior surface 305 radially and axially inwardly to a lip 334, and the body interior surface 306 extends radially outwardly and axially inwardly from the lip 334 to an axially inner edge 337. The angled extensions of the head radially interior surface 304 and body interior surface 306 facilitate operation of the device when a cable is inserted and to be retained as described elsewhere herein. In various embodiments, the radial distance from the axis T to the head radially interior surface 304 at the axially outer edge 333 is greater than the radial distance from the axis T to the lip 334 and greater than the radial distance from the axis T to the axially inner edge 337. Further, the radial distance from the axis T to the head radially interior surface 302 is less than the radial distance from the axis T to the body radially interior surface 308.

In various embodiments, such as shown in FIGS. 11 through 26, the body radially exterior surface 308 is threaded as at 320 to mate with the thread 81 on the barrel 60. In these embodiments, the radial distance from the axis T to the head radially interior surface 302 is less than the radial distance from the axis T to the body radially interior surface 306. As shown in FIGS. 24 through 26, the body interior surface 306 extends radially outwardly and axially inwardly from the lip 334 along a first interior portion 340 to an intermediate ridge 342 at a first angle X to the axis T, and further extends radially outwardly and axially inwardly from the intermediate ridge 342 along a second interior portion 344 to the axially inner edge 337 at a second angle Y to the axis, wherein the second angle Y is greater than the first angle X. The different angles facilitate maintaining an inserted cable in an appropriately angled channel such that the cable is guided into the retaining jaw 26 and through the fastening ring 24 and spacer 22. Further, the body radially exterior surface 308, in addition to including threaded portion 320, can include an unthreaded portion 345 extending axially inwardly from the threaded portion 320, as shown in FIG. 25.

In the embodiments of the present disclosure as shown in FIGS. 27 through 33, no bottom locking device 30 is employed. As shown therein, a hollow retaining cap 500 is provided and maintains shank ball segment 23 therein. The hollow retaining cap 500 can be provided with a thread 510 on an exterior surface thereof, wherein the thread 510 can mate with thread 83 of the barrel as shown in FIGS. 27 through 33. In various embodiments, the retaining cap 500 is made of steel or other rigid material.

In various embodiments such as shown in FIGS. 44 through 48, for example, the fastening ring 24, retaining jaw 26 and sleeve 28 can be formed as a single member cartridge 70 for employment in the device 10 as disclosed herein. The cartridge 70 may optionally include the spacer 22. In such embodiments, the axially extending wall 269 extending axially from the end wall 265 of the retaining jaw 26 can be formed with a slot 300 for receiving the base 52 of the fastening ring 24. The fastening ring 24, whether split or not, can be snapped into place within the slot 300. In such embodiments, the sleeve 28 at the radially wider depth end 286 can be formed with a retaining lip 310 that retains the end wall 265 of the retaining jaw 26 and restricts any axial movement of the retaining jaw 26 within the sleeve 28. The spacer 22 can be secured to the retaining lip 310 such as by adhesive, for example, and thereby form part of the cartridge 70. The internal tapered wall 282 of the sleeve 28 compresses the retaining jaw 26 as the jaw slides downward during installation of the cartridge 70. In various embodiments, the internal tapered wall 282 of the sleeve 28 is formed with a radially inwardly extending nub 288 to act as an axial stop for the retaining jaw 26. The overall cartridge 70 can have a top axial end surface 298, and the fastening ring teeth 58 can extend axially to or outwardly of the top axial end surface 298. Embodiments of the overall cartridge 70 can have a substantially cylindrical outer surface 322 and a substantially frustoconical interior surface 324.

In alternative embodiments, such as shown in FIGS. 49 and 50, the retaining jaw 26 is not slidably engaged with the internal tapered wall 282, but rather the internal wall 282 of the sleeve 28 is formed with receiving cavities 290 for receiving individual jaw elements of the retaining jaw 26. For example, if the slots 272 separating jaw elements 255, 256, 257 and 258 of FIG. 38 extended fully through the axially interior segment 266 of the retaining jaw 26, four independent jaw elements would be formed. Exemplary such jaw elements are shown at 293 and 294 in FIG. 49. Such jaw elements 293, 294 can be retained within the individual compartments 290 formed within the sleeve internal wall 282. It will be appreciated that in such embodiments, the sleeve 28 can be formed with axially extending slots or compression channels 295 to facilitate radial contraction and expansion during operation.

In operation, the device 10 can be assembled from the bottom or the top of the barrel 60, depending upon embodiment. In the bottom loading assembly, such as shown in FIGS. 1 through 26, the spacer 22 is inserted into the barrel 60 so as to abut the interior edge surface 68 of the barrel 60. The fastening ring 24 is inserted so as to engage the spacer 22 as shown in the drawings and as described elsewhere herein. The retainer jaw 26 is then inserted so as to engage the fastening ring 24 and the spacer 22 as shown in the drawings and as described elsewhere herein. The sleeve 28 and bottom locking device 30 are then inserted as described elsewhere herein with regard to FIGS. 1 through 18. Alternatively, FIGS. 19 through 26 illustrate the embodiment whereby the bottom locking device 30 is an integrated combination of a bottom locking device and sleeve. In such arrangement, the thread 320 on the bottom locking device radially exterior surface 308 engages the thread 81 of the barrel 60 and the unthreaded portion 345 of the body radially exterior surface 308 engages the bottom portion 74 of the interior surface 64 of the barrel 60. In this embodiment, the axially inner edge 337 of the body 332 engages the first wall 77 extending radially outwardly from the interior surface 64 of the barrel 60. The combination of the threaded connection between the bottom locking device 30 and the barrel 60 and the engagement of the axially inner edge 337 of the bottom locking device 30 with the first wall 77 of the barrel 60 provides a secure and stable connection that will not permit axial movement of the bottom locking device 30 during operation.

In assembly of the device 10 from the top of the barrel 60, such as shown in FIGS. 27 through 33, the sleeve 28, retaining jaw 26, fastening ring 24 and spacer 22 are inserted from the top of the barrel 60 and the sleeve 28 is maintained against the radially inwardly extending ledge 229 of the barrel 60. The retaining cap 500 can then be threadedly connected to the barrel interior 64.

The inner surface of the retaining jaw 26, the radially inner surface of the fastening ring 24, the interior surface of the spacer 22 and the interior surface of the sleeve 28 define a cable receiving cavity 195. It will be appreciated that the cable receiving component 40 is maintained in substantially axially static position within the interior surface of the barrel 60 upon insertion of a cable into the cable receiving cavity 195.

Prior to insertion of a cable, the device 10 is loaded as described above such that the cable receiving component 40 is inserted into the barrel 60. As disclosed elsewhere herein, the cable receiving component 40 can comprise multiple elements assembled and positioned together or can alternatively comprise a single, pre-joined and integrated cartridge device 70. Regardless of form, the cable receiving component 40 can be inserted into the barrel 60 and maintained securely within the barrel interior so as to prevent axial movement of the cable receiving component during operation.

It will be appreciated that the embodiments of the present disclosure work with and accommodate both insulated as well as uninsulated cables, wiring and other elements. It will be appreciated that the cable is not necessarily considered an element of the device and component as presently disclosed. An inserted cable extends past the optional bottom locking device 30, cartridge 70 and/or elements 28, 26 and 24. The retaining jaw 26 is maintained securely within the barrel 60 and does not slide axially as the cable is inserted. The pressure from the inserted cable against the jaw teeth 250 does not result in the retaining jaw 26 moving radially inwardly, yet the jaw teeth 250 maintain engagement with the inserted cable while permitting the cable to pass through.

As the cable element is pushed further into the barrel 60, it passes the fastening ring 24 and spacer 22. In doing so, the fastening ring teeth 58 are flexed radially outwardly so as to permit the inserted cable element to pass. As described elsewhere herein, the fastening ring teeth 58 may flex to the point of engaging angled inner ridge 125 of the spacer interior surface 124. The cable element can extend until it reaches resistance from the shank ball segment 23 or other internal element, for example. Once the cable element is fully inserted, any movement of the cable axially outwardly of the barrel 60 is resisted by the fastening ring teeth 58 and the jaw teeth 250, and it will be appreciated that the fastening ring teeth 58 will flex back from the position attained during insertion of the cable element to a position where the edges of the teeth 58 pinch the inserted cable element. At such time, the retaining jaw 26 is immediately and evenly engaged so as to remain in alignment and assist in securely engaging the inserted cable. Further, at such time, a fish tape or other device can be secured to the loop 12 in the rigid lanyard 15 for pulling the cable, such as through or outside of a conduit.

It will be appreciated that the cable receiving component remains in a substantially axially static position within the barrel when the device is fully assembled with the retaining cap fully secured to the barrel, regardless of the action of the inserted cable. Further, the threaded and/or snap in engagement of the retaining cap 500 and/or the bottom locking device 30 with the barrel 60 permits ease of assembly and disassembly of the device.

The angles, dimensions and materials described herein will be understood to be exemplary and provided as embodiments associated with proper working operation of the device, assembly and method as presently disclosed. Further, it will be appreciated that, in various embodiments, the members of the device and assembly disclosed herein can be formed through hydroforming processes.

The device, assembly and method as presently disclosed may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A device, comprising:
a barrel comprising an interior surface defining an interior cavity;
a cable receiving component maintained within the interior cavity of the barrel, wherein the cable receiving component comprises:
a retaining jaw formed with a leading edge, a trailing edge and an inner surface comprising a gripping segment and an outer surface comprising an axially exterior segment;
a fastening ring formed with a rim comprising a first face, a second face, a radially inner surface and fastening ring teeth, wherein the second face engages the trailing edge of the retaining jaw;
a spacer formed with an interior surface, a first end and a second end, wherein the second end of the spacer engages the first face of the fastening ring;
a sleeve formed with a sleeve interior surface, a sleeve exterior surface, a sleeve primary end and a sleeve secondary end, wherein the sleeve secondary end engages the axially exterior segment of the outer surface of the retaining jaw; and
a bottom locking device engaging the sleeve primary end.

2. The device of claim 1, wherein the inner surface of the retaining jaw, the radially inner surface of the fastening ring, the interior surface of the spacer and the sleeve interior surface define a cable receiving cavity and wherein the cable receiving component is maintained in substantially static position within the interior surface of the barrel upon insertion of a cable into the cable receiving cavity.

3. The device of claim 1, wherein the fastening ring teeth extending axially and radially inwardly from the fastening ring rim toward the interior surface of the spacer.

4. The device of claim 1, wherein the interior edge surface of the barrel extends radially inwardly from the barrel interior surface and wherein the first end of the spacer engages the interior edge surface of the barrel.

5. The device of claim 1, wherein the retaining jaw, the fastening ring and the sleeve are formed as a cartridge.

6. The device of claim 1, wherein the retaining jaw, the fastening ring and the spacer are formed as a cartridge.

7. The device of claim 1, wherein the retaining jaw is formed with a plurality of slots defining a plurality of jaw members, wherein the gripping segment comprises a plurality of jaw teeth formed on each jaw member of the plurality of jaw members, and wherein the retaining jaw is formed with a split between at least two of the plurality of jaw members.

8. The device of claim 1, wherein the retaining jaw is formed with an exterior surface comprising a substantially cylindrical portion and a substantially frustoconical portion.

9. The device of claim 1, wherein the sleeve interior surface is substantially frustoconical.

10. The device of claim 9, wherein the sleeve interior surface engages the retaining jaw exterior surface.

11. The device of claim 1, wherein the bottom locking device is formed with a thread and wherein the barrel interior surface is formed with a thread for mating engagement with the thread of the bottom locking device.

12. The device of claim 1, wherein the barrel interior surface is formed with a radial lip, a first wall extending radially outwardly from the interior surface to an axially extending interior wall, and a second wall extending radially inwardly from the axially extending interior wall to the radial lip, wherein the bottom locking device comprises a head for engaging the axially extending interior wall and the first and second walls of the barrel interior surface.

13. The device of claim 1, wherein the bottom locking device comprises:
a head integrally formed with a ring-shaped body, wherein the head comprises a head interior surface and a head radially exterior surface, wherein the body comprises a body interior surface and a body radially exterior surface, wherein the head interior surface and the body interior surface form an opening extending along an axis through the head and ring-shaped body; and
wherein the head interior surface extends from an axially outer edge radially and axially inwardly to a lip, and wherein the body interior surface extends radially outwardly and axially inwardly from the lip to an axially inner edge.

14. The device of claim 13, wherein the radial distance from the axis to the head radially interior surface is greater than the radial distance from the axis to the body radially interior surface.

15. The device of claim 13, wherein the radial distance from the axis to the head radially interior surface is less than the radial distance from the axis to the body radially interior surface.

16. A device, comprising:
a barrel comprising an interior surface defining an interior cavity;
a cable receiving component maintained within the interior cavity of the barrel, wherein the cable receiving component comprises:
a retaining jaw formed with a leading edge, a trailing edge, an inner surface comprising a gripping segment and an outer surface comprising an axially exterior segment, wherein the outer surface of the retaining jaw further comprises an axially interior segment, wherein the axially interior segment is substantially cylindrical and is maintained against the interior surface of the barrel; and
a sleeve formed with a sleeve interior surface, a sleeve exterior surface, a sleeve primary end and a sleeve secondary end, wherein the sleeve secondary end engages the axially exterior segment of the outer surface of the retaining jaw.

17. The device of claim 16, wherein the axially exterior segment is substantially frustoconical.

18. The device of claim 16, further comprising a fastening ring formed with a rim comprising a first face, a second face, a radially inner surface and fastening ring teeth, wherein the second face engages the trailing edge of the retaining jaw.

19. The device of claim 16, wherein the retaining jaw, fastening ring and sleeve are provided as a single, pre-joined integrated cartridge.

20. A device, comprising:
a barrel comprising an interior surface defining an interior cavity;
a cable receiving component maintained within the interior cavity of the barrel, wherein the cable receiving component comprises:
a retaining jaw formed with a leading edge, a trailing edge and an inner surface comprising a gripping segment and an outer surface comprising an axially exterior segment;
a fastening ring formed with a rim comprising a first face, a second face, a radially inner surface and fastening ring teeth, wherein the second face engages the trailing edge of the retaining jaw;
a spacer formed with an interior surface, a first end and a second end, wherein the second end of the spacer engages the first face of the fastening ring; and
a sleeve formed with a sleeve interior surface, a sleeve exterior surface, a sleeve primary end and a sleeve secondary end, wherein the sleeve secondary end engages the axially exterior segment of the outer surface of the retaining jaw, wherein the sleeve interior surface is substantially frustoconical and wherein the sleeve interior surface engages the retaining jaw exterior surface.

* * * * *